United States Patent [19]

Mical et al.

[11] Patent Number: 5,572,235
[45] Date of Patent: Nov. 5, 1996

[54] METHOD AND APPARATUS FOR PROCESSING IMAGE DATA

[75] Inventors: Robert J. Mical, Redwood City; David L. Needle, Alameda, both of Calif.

[73] Assignee: The 3DO Company, Redwood City, Calif.

[21] Appl. No.: 970,083

[22] Filed: Nov. 2, 1992

[51] Int. Cl.⁶ ................................................. G09G 5/02
[52] U.S. Cl. .................... 345/150; 345/153; 395/135; 395/139
[58] Field of Search ........................ 395/102, 109, 395/152, 163, 164, 118, 135, 133, 129, 130, 131, 132, 169, 139; 382/47, 298; 345/113, 147, 148, 150, 112, 127, 131, 132, 153, 154, 150; 348/592, 591, 580, 581, 584, 585, 586

[56] References Cited

U.S. PATENT DOCUMENTS

| | | | |
|---|---|---|---|
| 3,900,886 | 8/1975 | Coyle et al. | 381/56 |
| 4,149,184 | 4/1979 | Giddings et al. | 348/34 |
| 4,243,984 | 1/1981 | Ackley et al. | 340/703 |
| 4,247,106 | 1/1981 | Jeffers et al. | 273/85 G |
| 4,418,993 | 12/1983 | Lipton | 352/57 |
| 4,471,465 | 9/1984 | Mayer et al. | |
| 4,472,037 | 9/1984 | Lipton | 352/57 |
| 4,521,014 | 6/1985 | Sitrick | 273/1 GC |
| 4,521,770 | 6/1985 | Rhyne | 340/703 |
| 4,523,226 | 6/1985 | Lipton et al. | 358/88 |
| 4,562,463 | 12/1985 | Lipton | 358/88 |
| 4,572,509 | 2/1986 | Sitrick | 273/85 G |
| 4,580,782 | 4/1986 | Ochi | 273/86 R |
| 4,583,117 | 4/1986 | Lipton et al. | 358/92 |
| 4,635,516 | 1/1987 | Giannini et al. | 84/1.01 |
| 4,653,013 | 3/1987 | Collins et al. | 364/518 |
| 4,661,811 | 4/1987 | Gray | 345/150 |
| 4,674,051 | 6/1987 | Fischer | 364/443 |
| 4,731,848 | 3/1988 | Kendall et al. | 381/63 |
| 4,754,270 | 6/1988 | Murauchi | 340/731 |
| 4,757,384 | 7/1988 | Nonweiler et al. | 348/581 |
| 4,771,279 | 9/1988 | Hannah | 340/801 |
| 4,772,882 | 9/1988 | Mical | 340/709 |
| 4,774,678 | 9/1988 | David et al. | |
| 4,792,850 | 12/1988 | Liptoh et al. | 358/92 |

(List continued on next page.)

FOREIGN PATENT DOCUMENTS

| | | | |
|---|---|---|---|
| 0329418A2 | 8/1989 | European Pat. Off. | G06F 1/04 |
| 0437630A1 | 7/1991 | European Pat. Off. | G09G 5/36 |
| 0487267A2 | 5/1992 | European Pat. Off. | H04N 9/76 |
| 83/01391 | 4/1983 | WIPO | A63F 9/22 |
| 90/15383 | 12/1990 | WIPO | G06F 9/00 |
| 90/15385 | 12/1990 | WIPO | G06F 12/00 |
| 90/15396 | 12/1990 | WIPO | G06F 15/62 |
| 90/15395 | 12/1990 | WIPO | G06F 15/62 |
| 90/15381 | 12/1990 | WIPO | G06F 3/153 |
| 91/02309 | 2/1991 | WIPO | G06F 9/44 |
| 91/02308 | 2/1991 | WIPO | G06F 9/44 |
| 91/12588 | 8/1991 | WIPO | G06F 15/72 |
| 91/19272 | 12/1991 | WIPO | G06K 9/36 |
| 92/02897 | 2/1992 | WIPO | G06K 9/36 |

OTHER PUBLICATIONS

Intel Corporation, 82750DB Display Processor, Specification (Feb. 1991), pp. 1—1 thru 1–56.
Intel Corporation, 82750PB Pixel Processor, Specification (Feb. 1991), pp. 1–57 thru 1–119.

*Primary Examiner*—Steven Saras
*Attorney, Agent, or Firm*—Fliesler, Dubb, Meyer & Lovejoy

[57] ABSTRACT

The invention provides a method and apparatus for processing digital image data to produce realism-imparting effects such as shadowing, highlighting, color filtering, colored reflections rendering and the like. An image processing apparatus in accordance with the invention includes three independent processing units for processing the Red, Green and Blue components of a supplied set of image-defining signals. The apparatus provides either homogeneous intensity scaling for all three colors or intensity scaling on a color-by-color basis. Means are provided for changing the imparted effects in real time on a pixel-by-pixel basis. Means are provided for using one signal to control the effect imparted on a second signal.

40 Claims, 4 Drawing Sheets

U.S. PATENT DOCUMENTS

| | | | |
|---|---|---|---|
| 4,805,098 | 2/1989 | Mills, Jr. et al. | 364/900 |
| 4,814,976 | 3/1989 | Hansen et al. | 364/200 |
| 4,817,149 | 3/1989 | Myers | 381/1 |
| 4,824,106 | 4/1989 | Ueda et al. | 273/1 E |
| 4,827,249 | 5/1989 | Chauvel et al. | 340/703 |
| 4,847,604 | 7/1989 | Doyle | 340/706 |
| 4,847,608 | 7/1989 | Bouron | 340/747 |
| 4,849,745 | 7/1989 | Satou . | |
| 4,857,901 | 8/1989 | Lathrop | 340/703 |
| 4,866,524 | 9/1989 | Six | 345/148 |
| 4,879,676 | 11/1989 | Hansen | 364/748 |
| 4,884,876 | 12/1989 | Lipton et al. | 350/347 E |
| 4,905,168 | 2/1990 | McCarthy et al. | 364/521 |
| 4,907,171 | 3/1990 | Nagashima . | |
| 4,908,858 | 3/1990 | Ohno | 381/1 |
| 4,918,434 | 4/1990 | Ueda et al. | 340/703 |
| 4,918,436 | 4/1990 | Johary | 340/799 |
| 4,924,299 | 5/1990 | Mizuno | 345/147 |
| 4,931,751 | 6/1990 | Keller et al. | 332/108 |
| 4,939,672 | 7/1990 | Meadows | 364/521 |
| 4,947,240 | 8/1990 | Hausdörfer | 348/592 |
| 4,951,038 | 8/1990 | Yamamura | 340/725 |
| 4,951,229 | 8/1990 | DiNicola et al. | 364/518 |
| 4,951,230 | 8/1990 | Dalrymple et al. | 364/521 |
| 4,951,232 | 8/1990 | Hannah | 364/522 |
| 4,952,051 | 8/1990 | Lovell et al. | 352/87 |
| 4,953,073 | 8/1990 | Moussouris et al. | 364/200 |
| 4,959,779 | 9/1990 | Weber et al. | 364/200 |
| 4,960,384 | 10/1990 | Singer et al. | 439/155 |
| 4,967,268 | 10/1990 | Lipton et al. | 358/92 |
| 4,969,647 | 11/1990 | Mical et al. | 273/85 G |
| 4,974,187 | 11/1990 | Lawton | 364/728.01 |
| 4,979,033 | 12/1990 | Stephens et al. | 358/92 |
| 4,982,342 | 1/1991 | Moribe et al. | 364/518 |
| 4,988,892 | 1/1991 | Needle | 307/269 |
| 5,014,134 | 5/1991 | Lawton et al. | 358/261.3 |
| 5,027,270 | 6/1991 | Riordan et al. | 364/200 |
| 5,038,297 | 8/1991 | Hannah | 364/518 |
| 5,046,097 | 9/1991 | Lowe et al. | 381/17 |
| 5,051,737 | 9/1991 | Akeley et al. | 340/747 |
| 5,051,927 | 9/1991 | Tada et al. . | |
| 5,063,441 | 11/1991 | Lipton et al. | 358/88 |
| 5,068,911 | 11/1991 | Resnikoff et al. | 382/56 |
| 5,070,397 | 12/1991 | Wedderburn-Bisshop | 348/591 |
| 5,070,479 | 12/1991 | Nakagawa | 395/575 |
| 5,073,964 | 12/1991 | Resnikoff | 382/41 |
| 5,081,645 | 1/1992 | Resnikoff et al. | 375/1 |
| 5,091,717 | 2/1992 | Carrie et al. | 340/703 |
| 5,091,720 | 2/1992 | Wood | 340/721 |
| 5,101,364 | 3/1992 | Daverport | 395/152 |
| 5,101,446 | 3/1992 | Resnikoff et al. | 382/56 |
| 5,109,348 | 4/1992 | Pfeiffer | 395/164 |
| 5,113,285 | 5/1992 | Franklin et al. | 359/465 |
| 5,113,490 | 5/1992 | Winget | 395/119 |
| 5,121,191 | 6/1992 | Cassereau et al. | 358/13 |
| 5,125,671 | 6/1992 | Ueda et al. | 273/437 |
| 5,155,768 | 10/1992 | Matsuhara | 380/23 |
| 5,208,911 | 5/1993 | Newman et al. | 345/152 |
| 5,235,677 | 8/1993 | Needle et al. | 395/131 |
| 5,402,513 | 3/1995 | Schafer | 382/298 |

METHOD AND APPARATUS FOR PROCESSING IMAGE DATA

CROSS REFERENCE TO RELATED APPLICATIONS

This application is related to:

PCT patent application Ser. No. PCT/US92/09349, entitled AUDIO/VIDEO COMPUTER ARCHITECTURE, by inventors Mical et al., filed concurrently herewith, Attorney Docket No. MDIO4222, and also to U.S. patent application Ser. No. 07/970,308, bearing the same title, same inventors and also filed concurrently herewith;

PCT patent application Ser. No. PCT/US92/09342, entitled RESOLUTION ENHANCEMENT FOR VIDEO DISPLAY USING MULTI-LINE INTERPOLATION, by inventors Mical et al., filed concurrently herewith, Attorney Docket No. MDIO3050, and also to U.S. patent application Ser. No. 07/970,287, bearing the same title, same inventors and also filed concurrently herewith;

PCT patent application Ser. No. PCT/US92/09348, entitled METHOD FOR GENERATING THREE DIMENSIONAL SOUND, by inventor David C. Platt, filed concurrently herewith, Attorney Docket No. MDIO4220, and also to U.S. patent application Ser. No. 07/970,274, bearing the same title, same inventor and also filed concurrently herewith;

PCT patent application Ser. No. PCT/US92/09350, entitled METHOD FOR CONTROLLING A SPRYTE RENDERING PROCESSOR, by inventors Mical et al., filed concurrently herewith, Attorney Docket No. MDIO3040, and also to U.S. patent application Ser. No. 07/970,278, bearing the same title, same inventors and also filed concurrently herewith;

PCT patent application Ser. No. PCT/US92/09462, entitled SPRYTE RENDERING SYSTEM WITH IMPROVED CORNER CALCULATING ENGINE AND IMPROVED POLYGON-PAINT ENGINE, by inventors Needle et al., filed concurrently herewith, Attorney Docket No. MDIO4232, and also to U.S. patent application Ser. No. 07/970,289, bearing the same title, same inventors and also filed concurrently herewith;

PCT patent application Ser. No. PCT/US92/09460, entitled METHOD AND APPARATUS FOR UPDATING A CLUT DURING HORIZONTAL BLANKING, by inventors Mical et al., filed concurrently herewith, Attorney Docket No. MDIO4250, and also to U.S. patent application Ser. No. 07/969,994, bearing the same title, same inventors and also filed concurrently herewith;

PCT patent application Ser. No. PCT/US92/09384, entitled PLAYER BUS APPARATUS AND METHOD, by inventors Needle et al., filed concurrently herewith, Attorney Docket No. MDIO4270, and also to U.S. patent application Ser. No. 07/970,151, bearing the same title, same inventors and also filed concurrently herewith.

The related patent applications are all commonly assigned with the present application and are all incorporated herein by reference in their entirety.

BACKGROUND

1. Field of the Invention

The invention relates generally to image data processing. The invention relates more specifically to a low cost method for providing shadowing, highlighting and other image processing functions in a system which processes images in the form of digital signals.

2. Description of the Related Art

In recent years, the presentation and pre-presentation processing of visual imagery has shifted from what was primarily an analog format to an essentially digital format. Unique problems come to play in the digital processing of image data. The problems include providing adequate storage capacity for digital image data and maintaining acceptable data throughput rates. In addition, there is the problem of creating a sense of realism in digitally generated imagery, particularly in animated imagery.

The visual realism of imagery generated by digital video game systems, simulators and the like can be enhanced by providing special effects such as shadowing, highlighting and so forth. For example, when the image of an airplane is to be displayed flying over a flat terrain on a sunny day, the realism of the overall scene is enhanced by generating a shadow image of the airplane within the image of the terrain. The effect appears more realistic when the terrain region onto which the shadow is projected becomes dimmed rather than completely blackened. The observer continues to see part of the texture of the terrain even though it is covered by the airplane's shadow. The effect is referred to as "shadowing."

Highlighting is another example of realism-imparting effects. Suppose an explosive device is displayed detonating near the airplane. Visual realism is enhanced by momentarily increasing the brightness (highlighting) of the airplane's image to create the impression that light from the explosion is reflecting off the airplane's fuselage. The effect appears more realistic when certain brightness and/or colorization relationships between different parts of the airplane (e.g., cockpit, fuselage, wings) are maintained.

Home game systems, such as the Sega "Genesis" have a two-source image merging system for creating shadowing and highlighting effects on-the-fly (in real time). When the shadow effect is desired, a first source "tile" or "sprite" (rectangular block of bit-mapped data representing the airplane shadow region) is overlaid with a second source tile representing the underlying terrain. For every pixel position where the first (shadow) sprite intensity is non-zero, a digital signal representing the corresponding terrain intensity in the second tile is cut in half to thereby produce a "dimming" effect. The dimmed version of the terrain tile is then output as part of the video image. (The dimmed image data is not stored in memory however.)

To produce the highlighting effect, the Sega "Genesis™" system divides the shading value of all pixels within the airplane's sprite by two and then adds half the maximum shading value to each such pixel. This preserves the relative shading relation between parts of the airplane while making each brighter. The augmented version of the airplane tile is then output as part of the video signal, but not saved. It is not possible to both shade and highlight a tile at the same time in the Sega "Genesis™" system.

The above-described shadowing and highlighting techniques are of limited use. Optically-complex animated scenes require much more. Consider for example a scene in a Knights of the Realm kind of game. The hero enters the arch chamber of a church. Stained glass windows of different elevations, colorations, transparencies, shapes and angles surround the chamber. A villain is to be seen through the stained glass windows, approaching from the outside of the chamber at an angle relative to the stained glass windows. The scene is to be projected through, or displayed on, a two-dimensional window (hereafter, the observation plane). For added realism, the position of the observation plane (the window through which the game player views the scene) is to rotate slowly about the hero, thus giving a three-dimensional quality to the displayed two-dimensional scene.

Realistic rendering of such a scene has to take into consideration the transformation of outside light as the light passes at various angles through the stained glass windows to the observation plane. It also has to take into account the reflection of internal lighting off the stained glass windows toward the observer's plane. Moreover, if the villain throws a rock through one of the stained glass windows, the visual effects of the hole have to replace those of the removed window material. If the villain flings mud onto a window, the transparency and coloration of the affected window regions have to change accordingly.

Previously available home-game systems (e.g. Nintendo Entertainment System™, Sega Genesis™) were not capable of handling such optically-complex animated scenes in real time. Some commercial imaging systems such as the Silicon Graphics "Iris™" system do provide mechanisms for handling optical complexities in real time, but this is made possible only through the use of high speed computers, large memories and special custom circuitry. These commercial systems are therefore available only at very high cost.

Heretofore, a low cost system for providing realistic renditions of complex animated scenes has not been available.

SUMMARY OF THE INVENTION

The above-mentioned problems are overcome by providing a low cost method and apparatus for processing and rendering complex image scenes.

A signal processing apparatus in accordance with the invention comprises one or a plurality of pixel-component processing units (e.g. an R-unit, a G-unit and a B-unit) where each pixel-component processing unit includes: (a) first input selector means [211] for receiving and selecting one of a first set of plural image-defining signals; (b) second input selector means [212] for receiving and selecting an image-defining signal either from the first set or from a second set of plural image-defining signals; (c) multiply-factor selector means [222] for receiving and selecting one of a set of plural multiply values; (d) multiplier means [225], coupled to the first input selector means and the multiply-factor selector means, for producing a multiplied signal [226] representing the product of the value of an image-defining signal selected by the first input selector means [211] and a multiply value [MV] selected by the multiply-factor selector means [222]; (e) first divider means [231], coupled to the output of the multiplier means, for producing a left-side pre-scaled signal [210o] representing the value of the multiplied signal produced by multiplier means [225] divided by the value of a supplied first divide factor [Dv1]; (f) second divider means [233] for producing a right-side pre-scaled signal [220o] representing the output of the second selector means [212] divided by the value of a second supplied divide factor [Dr3]; (g) adder means [260] for producing a sum signal representing the sum of the values represented by the left and right-side pre-scaled signals; (j) third divider means [270] for producing a post-scaled signal [275] representing the value of the sum signal produced by the adder means [260] divided by the value represented by a supplied third-divide factor defining signal [Dv2']; and (h) wrap limiter means [280] for producing an optionally-limited signal representing the output of the third divider means [270] where the value of said optionally-limited signal is equal to the value of the signal produced by the combination of the adder means [240] and the second divider means [250], optionally limited to predefined minimum and maximum values [0 and 31].

The signal processing apparatus of the invention can apply a variety of effects to supplied image signals including scaling them through a "grey-openacity" operation (defined in the below detailed description), scaling them through a "color-openacity" operation (defined in the below detailed description), summing or subtracting the signals of two sources to produce a "fredluscence" effect, and cross-multiplying one of the supplied signals against another on a pixel-by-pixel basis using a "doloresizing" operation (defined in the below detailed description).

A method for defining the color or intensity of a destination pixel in accordance with the invention comprises the steps of: (a) receiving first and second source-image defining signals [SRC-A, SRC-B]; (b) selecting and scaling one of the first and second source-image defining signals [SRC-A, SRC-B] in accordance with a selected scaling factor [MV/Dv1] where the selected scaling factor can be itself defined by contents [D-bit] of one [SRC-A] of the first and second source-image defining signals; and (c) optionally combining [240, 260] the scaled image-defining signal [210o] with a second [220o] of the first and second source-image defining signals [SRC-A, SRC-B] to thereby define the color or intensity of a destination pixel. The above signal combining step can include adding and/or exclusive ORring together the signals to be merged.

BRIEF DESCRIPTION OF THE DRAWINGS

The below detailed description makes reference to the accompanying drawings, in which.

DETAILED DESCRIPTION

Referring to FIG. 1 (which figure is composed of subportions 1A and 1B), a block diagram of an image processing and display (IPAD) system 100 in accordance with the invention is shown.

A key feature of IPAD system 100 is that it is relatively low in cost and yet it provides mechanisms for handling complex image scenes in real time. This feature is made possible by including a Pen and Palette Manipulation Processor (PPMP) 200 on a single integrated circuit (IC) chip within the IPAD system 100. The PPMP 200 will be the focus of this disclosure, but its operations are best understood by first considering the video processing operations of system 100 in an overview sense.

FIG. 1 (which is composed of subFIGS. 1A and 1B, as indicated by the key) provides an overview of the IPAD system 100. Except where otherwise stated, all or most parts of system 100 are implemented on a single printed circuit board 99 and the circuit components are defined within one or a plurality of integrated circuit (IC) chips mounted to the board 99. Except where otherwise stated, all or most of the circuitry is implemented in CMOS (complementary metal-oxide-semiconductor) technology using 0.9 micron or smaller line widths. An off-board power supply (not shown) delivers electrical power to the board.

Although not fully shown, the IPAD system 100 is functionally divided into a destination-pixels color determining section (also referred to as a source-to-destination color mapping section) and a destination-image geometry determining section (also referred to as a source-to-destination point-to-point mapping section).

The color mapping section is charged with the task of receiving electrical or other signals representing the color and/or shading and/or illumination of the one or more pixels in one or more bit-mapped source images and converting these into electrical or other signals representing the color and/or shading and/or illumination of the one or more corresponding pixels in a bit-mapped destination image in accordance with user-supplied color-mapping control signals. The PPMP unit 200 (FIGS. 1B, 2A, 2B) resides within the color mapping section.

The point-to-point mapping section, on the other hand, is charged with the task of receiving electrical or other geometry-control signals representing a source-to-destination point-to-point mapping and identifying specific pixels within a bit-mapped destination image whose colors and/or shadings and/or intensities are to be changed to reflect a painting-over of a geometric region within the destination image by colors derived from a source image. The shape and size of the painted-over region is defined by the geometry-control signals.

Figure 1A:
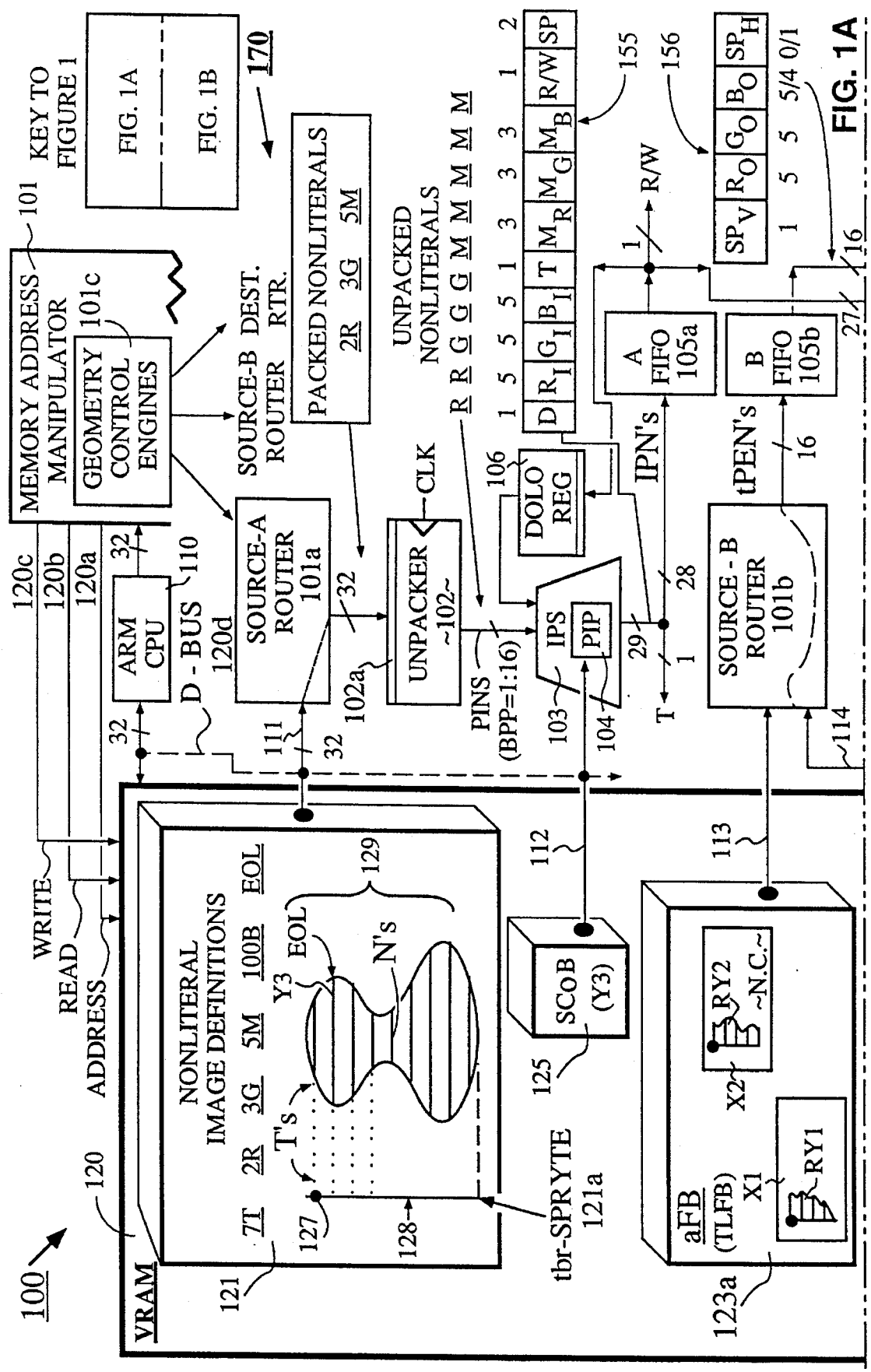
FIG. 1 (composed of subportions 1A and 1B) is a block diagram of an image processing and display system in accordance with the invention.
Figure 1B:
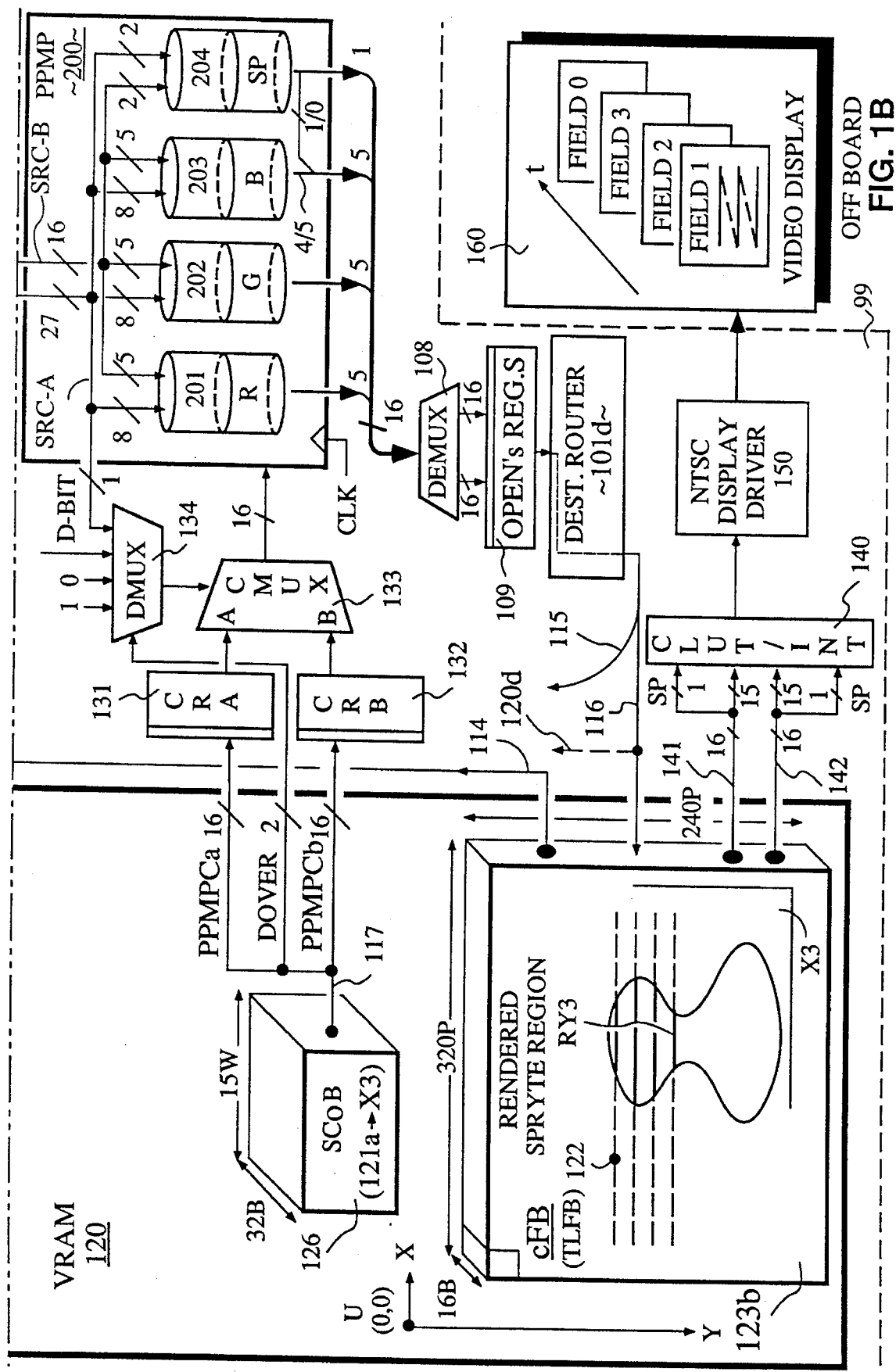

Broadly speaking, the IPAD system 100 includes a central processor unit (CPU) 110 (FIG. 1A), an addressable system memory which includes a video random-access memory unit (VRAM) 120, a display driver 150 (FIG. 1B) and a video display unit 160 (FIG. 1B). The video display unit 160 is located off board 99 and its circuitry can be implemented in technologies other than CMOS. The link between board 99 and display 160 can be provided through a baseband connection or by way of an RF modulator/demodulator pair.

CPU 110 is preferably a RISC type ARM610 microprocessor available from Advanced RISC Machines Limited of Cambridge, U.K. The CPU 110 is operatively coupled to the video random-access memory (VRAM) 120 such that the CPU 110 has read/write access to various control and image data structures stored within VRAM 120. For purposes of the disclosed invention, the CPU type is immaterial. A MOS Tech. 6502 would do just as well. Moreover, any means for loading VRAM 120 with a desired set of control instructions and image data will do just as well. Once appropriate data is loaded into VRAM 120 (or other parts of system memory, e.g., DRAM), the color and point-to-point mapping sections take control of VRAM 120 (or other system memory parts), fetch source image data and write back destination image data.

Direct memory access (DMA) hardware is provided for accessing contents of the VRAM 120 (or other parts of system memory) at high-speed within a so-called memory-address manipulator chip (MAMC) 101. Data within VRAM 120 (or other parts of system memory) is read or written on a time-multiplexed basis. The memory address manipulator chip (MAMC) 101 supplies memory address signals 120*a* to system memory at system-defined time slots. A memory-read tag 120*b* or memory-write tag 120*c* accompanies each address signal. Corresponding data signals flow into or out of system memory (VRAM 120) on a 32-bit wide D-bus 120*d*. The CPU 110 accesses data within the VRAM 120 (or other parts of system memory, not shown) by sending an access request to the memory address manipulator chip (MAMC) 101 and waiting for a grant from the MAMC 101 of a time slot on D-bus 120*d*.

The memory address manipulator chip (MAMC) 101 includes a set of so-called "geometry-control engines" 101*c*. These engines 101*c* include corner-calculating engines (not shown) that determine what pixel or pixels in a source image are to be mapped to a destination grid (bit-mapped destination image) and what the destination grid coordinates will be for the corners of each source pixel that is to be mapped to the destination grid. The geometry-control engines 101*c* also include an address-translating means (not shown) for converting destination grid coordinate values into signals representing corresponding memory addresses of VRAM 120 (or other parts of system memory).

Some of the operations of the geometry-control engines 101*c* will be discussed in more detail later. For now, it is sufficient to note that the geometry-control engines 101*c* periodically control the ADDRESS, READ and WRITE control lines (120*a*, 120*b*, 120*c*) of VRAM 120 and that the geometry-control engines 101*c* respond to a supplied set of so-called "transparency-control signals" (T-bits output from IPS unit 103 of FIG. 1A) by not performing what would otherwise be a write of a destination-pixel color-code signal (open signal) into VRAM 120 when a corresponding T-bit is active (logic true). This creates the effect of a transparent hole in the rendered image.

The geometry-control engines 101*c* also respond to a supplied set of so-called "R-mode control signals" (R/W-bits) by converting what would otherwise be an address signal 120*a* tagged with a write flag 120*c* into an address signal 120*a* tagged with a read flag 120*b* when a corresponding R-bit is active (logic true).

The VRAM 120 has the capacity to store 1 megabyte of data but it can be expanded to store 2, 4 or 16 megabytes of data. (A byte consists of eight bits of data.) One megabyte is a preferred but not absolute minimum storage capacity. The system will work with a VRAM of smaller capacity also.

The CPU 110 reads and writes data from/into the VRAM 120 in the form of 32-bit wide "words" that are transferred over D-bus 120*d*. Physically, the VRAM 120 is split into left and right banks each having its own independent address port and each having a 16-bit wide data port. This gives hardware devices, such a soon-to-be described CLUT/INT unit 140, simultaneous access to two separately addressable 16-bit "half-words". For most instances of concern here, it can be assumed that the same address is applied to both banks (not shown) of VRAM 120 and as such, VRAM 120 can be considered a unitary whole.

VRAM 120 is programmed to contain image-defining data in a variety of VRAM address regions, including regions 121, 123*a* and 123*b*. VRAM 120 also contains image-rendering control data (e.g. SCoB data) in regions such as 125 and 126. VRAM 120 further contains instruction code for execution by the CPU 110 in other regions (not shown).

Image-defining data within VRAM 120 is divided into two basic kinds, literal (unpacked) and non-literal (compressed). There are two formats for literal image data: TLFB (Totally Literal Frame Buffer format) and TLNF (Totally Literal NonFrame-buffer format). The TLFB and TLNF formats contain only pixel-shading information—there is no spryte-shape defining information. (The term "spryte" will be defined shortly). TLFB format is distinguished from TLNF format in that the former is structured to conform with the physical left/right bank addressing structure of VRAM 120 while the latter is not.

There are at least eight different formats for non-literal (compressed) image defining data. The distinguishing detailed aspects of such data need not be discussed here. Generally speaking, compressed data uses fewer bits per pixel for shade-definition than does literal data. Unique Bits-Per-Pixel (BPP) values can be assigned to compressed image words stored in different regions of VRAM 120. (E.g., BPP=1, 2, 4, 8, 16 are convenient but not necessary settings for packing image-defining data into 32-bit wide words.)

A key difference between the non-literal (compressed) image-defining data and the literal data of IPAD system 100 is that the former includes information for defining non-rectangularly shaped image areas (sprytes) while the latter is constrained to defining image areas as square or rectangular blocks. The term "spryte" will be explained in detail shortly. For now it is sufficient to define a spryte as a collection of image lines wherein each image line can have a different length.

Regions 123*a* (FIG. 1A) and 123*b* (FIG. 1B) are shown to contain literal image data while region 121 (FIG. 1A) is shown to contain non-literal image data. Region 123*b* is designated as the "Current Frame Buffer" (cFB) by a system variable (by data in a hardware register called REGCTL2, not shown). The system variable (cFB pointer) can be switched at any time to designate region 123*a* rather than 123*b* as being the cFB. Hence, region 123*a* is sometimes referred to here as the "alternate Frame Buffer" (aFB for short).

The non-literal image data in region 121 has to be "unpacked" from its compressed format into literal form before it can be written into desired portions of TLFB regions 123*a* and/or 123*b*, and thereafter used intelligently by the display hardware (140, 150, 160, FIG. 1B) to produce a displayed image. Literal image data consumes more memory space per pixel than does nonliteral data but the former does not require unpacking prior to display.

Display driver 150 is a multi-format video display driver that is operatively coupled to VRAM 120 by way of a Color Look-Up Table unit (CLUT) and pixel interpolating (INT) unit 140 to produce NTSC format video signals and/or Super-VHS video signals and/or PAL (European Standard) video format. The CLUT converts VRAM-internal data (which is extracted over video-output lines 141, 142) from a 14 or 15 shading-bits-per pixel format (referred to hereafter as the "PEN" code) to a 24 shading-bits-per pixel format. The interpolator uses so-called horizontal and vertical subposition bits (SP) that are stored together with the PEN codes to optionally expand the received frame data from an apparent 320-by-240 pixel (P) format to an apparent 640P-by-480P format. Data within cFB 123*b* can also be displayed in its non-expanded 320P-by-240P formats.

Display driver 150 periodically fetches TLFB-formatted display data (e.g. at a rate of 60 fields a second when display driver 150 is operating in NTS mode) from one of the literal image-defining regions (123*a*, 123*b*, there can be more than two such regions) of VRAM 120 by way of the CLUT/INT unit 140, converts the data from a 24 shading-bits-per pixel RGB format (or another digital format such as YCC) into NTSC or PAL or Super-VHS analog signal format, and supplies the converted signal to the video display unit 160 (e.g., color television monitor or color liquid crystal display panel). For the case of NTSC display, each pair of frames (a frame consists of two fields) is divided into four interlaced fields (FIELDS 1, 2, 3 and 0). The four fields are sequentially flashed to the eyes of an observer (not shown) over time to create the illusion of an animated scene. In some instances, the viewer may be wearing stereoscopic eyeglasses (e.g., liquid crystal shutters, not shown) which alternatively block light from reaching one or the other of the viewers left and right eyes so as to create a three-dimensional effect. The stereoscopic image is appropriately distributed across FIELDS 0–1 and 2–3 for such instances.

In the illustrated example, the cFB pointer (not shown) has designated region 123*b* as the "current frame buffer" (cFB). The video display driver 150 is shown to be conceptually receiving its data from the designated cFB region 123*b*. Any region of VRAM 120 can serve as the cFB. Typically there are at least two totally-literal frame buffers (e.g., TLFB's 123*a* and 123*b*) within VRAM 120 and the cFB pointer alternates between them as major changes of scene take place in real time on the display screen.

An explanation is warranted here about the way that data is shown to be "conceptually" transferred in FIGS. 1A, 1B between regions of VRAM 120 and various other parts of the IPAD system 100. Actually, all such data, except that transferred over video-output lines 141 and 142, is transferred from a first data port of VRAM 120 by way of a single, system-wide data bus (the D-bus 120*d*). The VRAM 120 has a separate, second data port for transferring video-output data over lines 141, 142. (Examples of such two-port VRAM devices include the Toshiba TC524256AJ/AZ-12™, the NEC uPD482234™ fast-page VRAM and the NEC uPD482235™ hyper-page VRAM).

The operations of the IPAD system 100 would be more difficult to explain if all components of the system were shown simply connected by a common D-bus 120*d* to the VRAM 120. Illustrative liberty is therefore taken to show which data is transferred from and/or to what parts rather than showing each specific D-bus connection. Data transfer lines 111 through 117 represent respective transfers of data over D-bus 120*d* between VRAM 120 and a corresponding other component of IPAD system 100. They are to be viewed as conceptual rather than physical constructs. The transfers actually occur over D-bus 120*d*.

An additional illustrative liberty is taken to show that VRAM data is selectively "routed" between certain components and selected regions of VRAM 120. To this end, implied data routers 101*a*, 101*b* (FIG. 1A) and 101*d* (FIG. 1B) are shown interposed between some of the data-transfer lines (e.g., 111, 113, 116) and the data sending or receiving component. Actually, there are no such data routers 101*a*, 101*b*, and 101*d* in the IPAD system 100. The implied functions of routers 101*a,b,d* are instead performed by the memory address manipulator chip (MAMC) 101. Time-multiplexed utilization of the system address bus 120*a* and system D-bus 120*d* is used to route data between different hardware locations. Implied routers 101*a*, 101*b* and 101*d* are therefore to be viewed as being simply direct connections from the system D-bus 120*d* to the designated component. Their implied functions, however, which are performed by the MAMC 101, are respectively: a selective routing 101*a* of data from a specified first source-image region (e.g., 121) of VRAM 120 to a data-unpacking unit 102; a selective routing 101*b* of data from a specified second source-image region (e.g., 123*a* or 123*b*) of VRAM 120 to a "B-FIFO" unit 105*b*; and a selective routing 101*d* of data from a set of oPEN-code storing registers 109 to a specified destination region (e.g., 123*b* or 123*a*) of VRAM 120.

The cFB region (region 123*b*) defines a 320-by-240 matrix of square pixels. The color and/or intensity of each cFB pixel is represented by a 16-bit-wide data field. The 16-bit wide data field is elsewhere referred to as a PEN code. When extracted by the display hardware (140, 150, 160), the PEN code is decoded by the CLUT/INT unit 140 to define the final color and/or shading and/or illumination value of each displayed pixel. When the RGB format is employed, 5 of the 16 PEN bits define one out of 32 possible Red gun intensities, 5 of the bits define one out of 32 possible Green gun intensities, and 4 (or 5 depending on whether a two or one SP-bits per pixel interpolation mode is selected) of the bits define one out of 16 (or one of 32, depending on mode) possible Blue gun intensities. (Aside: It was found that the human eye is less sensitive to intensity variations in the blue portion of the visible spectrum relative to variances in the red and green parts of the spectrum, and hence it is acceptable to provide less variance at the blue end when one of the 15 bit positions in the RGB field is to be borrowed for performing other functions such as defining an SP-bit.)

When 4-bit blue mode is employed, the remaining 2 of the 16 PEN bits are referred to as H and V subposition bits ($SP_H$ and $SP_V$). They are used by the image interpolating portion of unit 140 for visual field expansion. Although the format of the cFB 123 is 320×240 pixels, it is possible to expand it into an apparent 640×480 pixels format by judiciously weighting and copying the shading value of each original pixel in the 320×240 format to a selected one of 4 corresponding pixel spaces (pixettes) in the 640×480 format. The remaining three pixel spaces (pixettes) in the higher resolution image are similarly filled through the use of an interpolation algorithm. The 2 extra bits in each 16-bit wide pixel-field control the one-out-of-four placement step. A method for carrying out the interpolation is described in the above-cited copending patent application, "RESOLUTION ENHANCEMENT FOR VIDEO DISPLAY USING MULTI-LINE INTERPOLATION", PCT/US92/09342 Atty Ref. No. MDIO-3050.

When 5-bit blue mode is employed, one of the SP bits is fixed as one or zero and the remaining one non-RGB bit of the 16 PEN bits is referred to as the variable subposition bit and is used as such for interpolation.

Referring to the top left portion of FIG. 1A, a horizontally-striped non-rectangular area, Y3, which forms part of a "to-be-rendered Spryte" 121a (or "tbr-Spryte 121a" for short), is shown to be contained within image-defining region 121. For simplicity, area Y3 is referred to as a "nontransparent" portion of the tbr-Spryte 121a. (Actually, the portions if any, of the tbr-Spryte that will be "transparent" or "non-transparent" are not defined until after the data from region 121 passes through a downstream IPS unit 103 and a transparency-indicating "T-bit" is tagged onto the data. For the sake of explanation we will assume that we know ahead of time which parts of tbr-Spryte 121a are transparencies (T's).)

A counterpart image region, RY3, which is also referred to here as a "Spryte-painted region" (or "Sp-region" for short), is shown to be contained within image-defining region 123b (within the current frame buffer). The painted Sp-region, RY3, is shaped the same as the non-transparent portion Y3 of the tbr-Spryte 121a to indicate that, when spryte rendition completes, the pixels of Sp-region RY3 will have been derived (mapped) from pixel information contained in the tbr-Spryte 121a.

This is not to say that the outline of Sp-region RY3 is necessarily discernable when the contents of current buffer area 123b are examined. All the pixel-defining, 16-bit wide, data fields (PEN codes) stored in cFB 123b are treated the same. There is no information within cFB 123b that distinguishes between a pixel within rendered region RY3 and one outside RY3. Image data in the cFB is seamless. The only way it is possible to recognize that the PEN codes in rendered region RY3 where derived from codes residing in nontransparent region Y3 of the tbr-Spryte 121a is by following signal flow over time through system 100.

This signal flow will be discussed in detail later below. For now, it is sufficient to note that image data from VRAM region 121 flows along a data-transfer path 111 by way of implied data-router 101a, into unpacking unit 102, and then through an unpacked-code processing-unit (IPS) 103, and then into an A-FIFO 105a, which is followed by the PPMP unit 200 (FIG. 1B), a demultiplexer 108, a set of oPEN codes storing registers 109 and implied destination-router 101d, into region 123b of the VRAM 120; in the recited order.

The term "spryte" has already been used above a number of times with only a short explanation. A more detailed definition is now given.

Conventional imaging systems are built around the concept of a "sprite". (The different spelling for the earlier mentioned "spryte" is intentional here.) A conventional "sprite" consists of a rectangularly-shaped area of image data such as rectangular region X2 shown within buffer area 123a (FIG. 1A).

Conventional systems create the illusion of animation by periodically changing the relative position of their current rectangular sprites on the display screen. The internal data contents of the sprites are also changed over time.

It has been found through experience that internal change of data contents within a conventional sprite predominantly take place within non-rectangular subportions (e.g., RY1, RY2) of the rectangular areas (e.g., X1, X2). No changes take place in the other N.C. subportions of each rectangular area. Time and memory is wasted in conventional systems by repeatedly rendering the nonchanging (N.C.) subportions.

To avoid such waste, the present system 100 utilizes an image construct that is referred to here as a "spryte". (Note: the pronunciation is the same as "sprite" but the spelling is different.)

Referring to area 121 of FIG. 1A, a "spryte" is defined as a compilation of horizontal scan-line segments 129 extending from and to the right of a vertical (hypothetical) spryte edge line 128. The top of the spryte edge line is defined by a spryte corner position 127. The total number of horizontal lines 129 which collectively define a spryte (e.g., the tbr-Spryte 121a which includes region Y3) is given by a spryte line count that is stored in a hardware register (not shown). (A VCNT control word is defined in a below Table 1.6 entitled, SPRYTE PREAMBLE WORDS).

The horizontal scan lines 129 which define a single spryte (e.g. tbr-Spryte 121a) can be each of a different length. Their lengths can vary from zero pixels to the maximum number of pixels per line allowed in the system (1024 max pixels per spryte row in one embodiment of the invention).

Each horizontal scan line 129 of a spryte can include a plurality of "transparent-code" pixels (T's) and/or a plurality of "non-transparent code" pixels (N's). The right end of each horizontal scan line 129 is defined either by an End-of-Line (EOL) terminator code or a line length count stored within a line-length counter (not shown). Non-transparent pixel codes (N's) can be used to overwrite the PEN codes of corresponding pixel positions in a rendition destination area such as RY3. Transparent-pixel codes are used as position holders (or shape-definers) and they are not used to overwrite the PEN codes of corresponding pixel positions in a rendition destination area (e.g. the area outside of RY3).

When the tbr-Spryte 121a is to be rendered into cFB 123b, a reference spot 122 (FIG. 1B), corresponding to spryte top-left corner 127 (FIG. 1A), is defined in the destination area 123b. (The geometry-control engines 101c of MAMC unit 101 are charged with the task of generating an address signal [XPOS, YPOS] that points to location 122 of VRAM 120.)

For each Transparent-pixel (T's) found in the source spryte Y3, a corresponding one or more destination pixels (or fractional destination pixels, depending on whether image expansion or compression is also taking place) are skipped past while moving to the right of spot 122 (or to the left of spot 122 if an alternate, not shown, geometry mapping is used). Then a corresponding number of further pixel positions in destination region 123b are overwritten with new image data arising from the Nontransparent-pixels (N's) of the same source line. When the EOL of a spryte source line is encountered, the rendition process begins again at a new destination line position that is spaced away from spot 122 in accordance with a specified point-to-point mapping function, and the next spryte source line is rendered. The process continues until destination region RY3 is filled with image data originating from nontransparent portion Y3 of tbr-Spryte 121a.

Each literal image defining region (e.g., cFB 123b or alternate frame buffer region 123a) can contain one, none or a plurality of spryte-filled regions (e.g., RY1, RY2, RY3). Each spryte-filled region (e.g., RY1, RY2, RY3) can have a different outline.

When the horizontal scan lines of a spryte contain no Transparent-pixels (T's) and each scan line is of equal length, the spryte reduces to a particular rectangularly-shaped variation matching the characteristics of the more commonly known "sprite".

The hardware of system 100 is specially designed for rendering one or more lines of each source spryte in minimal time and for using a minimal amount of integrated-circuit die area. The spryte-rendering hardware includes the soon-to-be detailed PMPP unit 200 and other components, some of which have already been mentioned (e.g., unpacker 102, IPS unit 103, A-FIFO 105a, demultiplexer 108 and OPEN codes storing registers 109).

Operations of the spryte-rendering hardware are controlled by color-mapping control data and geometry-mapping control data stored in the VRAM 120.

Each to-be-rendered spryte (e.g. tbr-Spryte 121a) is associated with a Spryte-rendition Control Block (SCoB) such as the one illustrated at 126 (FIG. 1B). SCoB 126, for example, is associated with source spryte region 121a and destination region X3 (a subregion of 123b that includes rendition starting point 122). The VRAM 120 includes a SCoB Associating Register File (SCARF, not shown) which links each to-be-rendered spryte (e.g., 121a) to a SCoB.

A SCoB can be generally described as a 15-word wide by 32-bits deep region of VRAM 120 (some fields of the SCoB are less than 32 bits deep, as will be seen shortly). The SCoB contains source-to-destination color-mapping control words and/or flag bits plus source-to-destination point-to-point mapping control words and/or bits. Two of these control words define the X-by-Y positioning of the spryte rendering spot 122 relative to a (0,0) Universe origin of a displayable scene. A below Table 1.0 describes these and other parameters in more detail. Starting point 122 of a spryte rendition is defined in Table 1.0 by the two 32-bit wide variables, XPOS and YPOS.

Other data within the SCoB determine whether the rendered spryte will be larger or smaller in size relative to the source spryte, whether the rendered spryte will be rotated relative to the X axis and Y axis of the destination grid, and so forth. A more detailed description of the SCoB data structure is found in the below Tables 1.0 through 1.3. Table 1.4 defines a related spryte-rendering engine control word.

TABLE 1.0

SCoB Data Structure

| Number of Bits | Name | Description |
|---|---|---|
| 32 | FLAGS | Assorted flags. This is the first word read by the spryte-rendering hardware!! (The flag bits are detailed in below TABLE 1.1) |
| 24 | NEXTPTR | Address of next SCoB to process. (Format is absolute or relative.) Spryte rendition takes place by stepping through a linked list having one or more SCoB's. After a first source spryte is mapped to, and painted onto a destination grid area defined by its SCoB, the spryte-rendering engine processes the next SCoB, if any, and renders its source spryte onto its designated destination surface. The linked list can be circular if desired so that the process is repeated iteratively. |
| 24 | SOURCEPTR | Address of image data that is to be rendered as a spryte. |
| 24 | PIPPTR | Address of Pen Index Palette (PIP) that is to be loaded into the IPS unit (103 in FIG. 1A). |
| 32 | XPOS | Horizontal position (in 640-max pixels format) in the destination grid of the upper left corner of the to-be rendered SPRYTE, including 16 bits which represent a fraction (non-integer) position-defining portion. |
| 32 | YPOS | Vertical position (in 480-max pixels format) in the destination grid of the upper left corner of the to-be rendered SPRYTE, including 16-bit fraction part. |
| 32 | DX | Horizontal position increment from mapped first corner of a source pixel to mapped second corner of a source pixel when scanning and remapping the first spryte row onto the destination grid (format is two 16-bit half-words which are expressed in integer.fraction form as: 12.20). |
| 32 | DY | Vertical position increment from mapped first corner of a source pixel to mapped third corner of a source pixel when scanning and re-mapping the first spryte row (12.20). |
| 32 | LINEDX | Horizontal position increment in destination grid from top left corner of 1st mapped spryte row to top left corner of 2nd mapped spryte row (16.16). |
| 32 | LINEDY | Vertical position increment from 1st line to 2nd (16.16). |
| 32 | DDX | Increment to DX for each successive row after the 1st row of the spryte being rendered (12.20). |
| 32 | DDY | Increment to DY for each successive line processed (12.20) after 1st line. |
| 32 | PPMPC | PPMP control word (two halfwords: 16, 16). |
| 32 | PRE0 | Possible 1st preamble word. |
| 32 | PRE1 | Possible 2nd preamble word. |

<END OF TABLE 1.0>

TABLE 1.1

FLAGS Data Structure

FLAGS: (These flag bits control specific fetching and rendering operations of the spryte-rendering engine. The data specific control bits are found in the preamble word of the source data.)

| Bits | Name | Description |
|---|---|---|
| B31 = | SKIP | If set, skip this SCoB. |
| B30 = | LAST | If set, this is the last SCoB to process. |
| B29 = | NPABS | 1=Absolute, 0=Relative address for NEXTPTR. |
| B28 = | SPABS | 1=Absolute, 0=Relative for SOURCEPTR. |
| B27 = | PPABS | 1=Absolute, 0=Relative for PIPPTR. |
| B26 = | LDSIZE | Load 4 words of size and slope data. (DX, DY, LINEDX, LINEDY). |
| B25 = | LDPRS | Load 2 words of perspective (skew control) data. (DDX, DDY). |
| B24 = | LDPPMP | Load new PPMP control word (PPMPC) into PPMP control registers. |
| B23 = | LDPIP | Load new PIP data into PIP. |
| B22 = | SCoBPRE | Preamble location. 1=At end of SCoB, 0=At start of source data. |
| B21 = | YOXY | Translate the XY values to a system memory address value and write the corresponding data to the hardware. |
| B20:B19 = | xx | Reserved. |
| B18 = | ACW | Allow rendering of a CW (clock-wise) oriented destination pixel. |
| B17 = | ACCW | Allow rendering of a CCW oriented destination pixel. |
| B16 = | TWD | Terminate rendition of this Spryte if wrong direction is encountered (CW-CCW). |
| B15 = | LCE | Lock the operations of the 2 corner-calculating engines together. (at H change). |
| B14 = | ACE | Allow the second corner-calculating engine to function. |
| B13 = | ASC | Allow Super-Clipping (the local switch is ANDed with ASCALL). |
| B12 = | MARIA | 1=disable fun-math region-fill action and use only the faster Munkee decisions as instructions to the destination line-filler. |
| B11 = | PXOR | 1=set PPMP XOR mode. (XOR the A and B sources while disabling adder.) |
| B10 = | USEAV | 1=use the "AV" bits in PPMPC to control PPMP math functions. |
| B9 = | PACKED | Primary source spryte type, 1=packed, 0=totally literal. (Secondary source spryte is always totally literal.) |
| B8:B7 = | DOVER | D-Mode override. 00=use the D-bit generated by the IPS unit to select the output of CMUX, 01=reserved, 10=select the A input of the CMUX, 11=select the B input of the CMUX. |
| B6 = | PIPPOS | Use PIP generated bits as the subposition bits (B0 & B15 of the Output-PEN signal) instead of the SCoB selection made below by B15POS and B0POS. |
| B5 = | BGND | 1=background SPRYTE type. |
| B4 = | NOBLK | 1=no black SPRYTE type. |
| B3:B0 = | PIPA | PIP address bits, these are used to pad the 5-bit wide PIP address input signal when BPP (Bits Per Pixel) output of unpacker is less than 5 bits wide. |

<END OF TABLE 1.1 >

TABLE 1.2

PPMC Data Structure

The PPMP control word has two 16-bit wide halves. One half is used when the CMUX select control bit=0, the other half is used when the CMUX select control bit=1. Only the upper half is described here. The lower half has identical structure.

| Bits | Name | Description |
|---|---|---|
| B31= | S1 | Select 1st multiplier input signal. 0=use IPN (Source A), 1=use cFB data (Source B). |
| B30:B29= | MS | Select 2nd multiplier input signal. 0=MxF (source is SCoB), 1=MUL (source is IPS), 2=IPNM (source is IPS), 3=xx (multiply by default value, 1 or 0). |
| B28:B26= | MxF | Multiply Factor. 0–>7 means multiply by 1–>8. (only used if MS=0). |
| B25:B24= | Dv1 | First divide-by Scaling-factor. 1=divide by 2, 2=divide by 4, 3=÷8, 0=divide by 16. |
| B23:B22= | S2 | Selector of secondary input signal. 0= "apply 0 value to Adder port B", 1=use AV word (from SCoB), 2=use cFBD (Source B), 3=use IPS output (Source A). |
| B21:B17= | AV | Adder Value. 5 bit value to be added if S2=1. This 5-bit signal is also used as a math control word if USEAV=1. |
| B16= | Dv2 | Post addition, 2nd divider. 0=divide by 1, 1=divide by 2. |

<END OF TABLE 1.2>

TABLE 1.3

Secondary AV Bit Functions

Aside from providing an "add value", the AV bits serve a secondary function as follows when USEAV=1.

| Bits | Function |
|---|---|
| AV0 = | Invert the output of the second divider in the PMPP and set the carry-in of the adder. |
| AV1 = | Enable the sign-extend function for the signals flowing down the second math side of the PMPP (Post possible XOR). |
| AV2 = | Disable the wrap-limiter function. (Use the 5 LSB's of the 8-bit adder output and ignore possibility that it wrapped above decimal 31 or below decimal zero.) |
| AV3:AV4 = | Select second side divider value as: 00=divide by 1, 01=divide by 2, 10=divide by 4, 11=divide by _ (reserved). |

<END OF TABLE 1.3 >

TABLE 1.4

Engine Control Data Structure

There is also a general SPRYTE-rendering engine control word. It is loaded only by the CPU. Its bits are:

| Bits | Name | Description |
|---|---|---|
| B31:B30= | B15POS | B15 oPEN selector for output of PMPP. (This bit can function as a subposition defining bit that is used by the pre-display interpolater.) 0=0, 1=1, 2=xx, 3=same as Source data |
| B29:B28= | B0POS | B0 oPEN selector for output of PMPP. (This bit can also function as a subposition defining bit that is used by the pre-display interpolater.) 0=0, 1=1, 2=PPMP math, 3=same as Source data |
| B27= | SWAPHV | 1=Swap the H and V subpositions prior to their entry into the PPMP |
| B26= | ASCALL | 1=Allow super clipping function (master enable switch) |
| B25= | xx | Reserved |

TABLE 1.4-continued

| | | | |
|---|---|---|---|
| B24= | CFBDSUB | | 1=use the H and V subposition bits of the cFB data in place of (vice) the SPRYTE source values when the cFB data is selected as a PPMP source. (Note: CFBDsel=(S1=1) OR (S2=2).) |
| B23:B22= | CFBDLSB | | cFBD PPMP Blue LSB source. 0=0, 1=cFBD[B0], 2=cFBD[B4], 3=x |
| B21:B20= | IPNLSB | | IPN PPMP Blue LSB source. 0=0, 1=IPN[B0], 2=IPN[B4], 3=x |

NOTE#1: When 'relative' has been specified in the flags for NEXTPTR, SOURCEPTR, or PIPPTR, the value that should (must) be placed in the SCoB is the word distance from the address in RAM that has the relative value in it to the address in RAM that is desired to be the new address MINUS FOUR.

REL= Target - PC - 4

NOTE#2: The B0POS value of '2' is the only setting that uses PPMP math to control the B0 bit in the actually output oPEN signal. When this setting is chosen, the Blue LSB will also be included in the input parameters of the black detector.

NOTE#3: SCoB Loading Process.

The first 6 words of a SCoB (FLAGS, NEXTPTR, SOURCEPTR, PIPPTR, XPOS, YPOS) are always read out of VRAM by the DMA engine (inside the memory address manipulator chip (MAMC) and generally placed into corresponding hardware registers. The last 2 words (XPOS, YPOS) are always read as part of the general 6-word SCoB read, but they are not written to the hardware registers if this Spryte is to be skipped (SKIP=1) or YOXY is set to 0.

The remainder of the SCoB words are optionally downloaded into the hardware. The hardware registers are left in their pre-existing states if the corresponding SCoB words are not downloaded.

The optionally downloaded 7 SCoB words are be divided into the following successive groups: (a) Size and slope data (4 words), (b) Perspective or skew-control data (2 words: DDX & DDY), and finally (c) the PPMP control word (1 word). These 7 SCoB words are read out of VRAM as one burst regardless of which specific ones have been requested.

After the nonoptional and/or optional SCoB words are read out of VRAM, the preamble word or words are read. This is not optional.

The last group of words read (optionally) out of VRAM is the PIP data (max 16 words). Note that, if read, the PIP is the LAST element of the SCoB that is read. The length of the PIP read will vary depending on the BPP setting of the current Spryte. If LINEAR=1, the PIP can still be loaded even though it is not used.

<END OF TABLE 1.4>

TABLE 1.5

Spryte Image Data Formats

There are 2 basic formats of Spryte image data, Totally literal format and non-totally literal format. There are sub-groups within each basic format. In non-totally literal Sprytes, the image data consists of groups of words that represent source scan lines of data. In totally literal Sprytes, the image data consists of purely image data (no intermingled control functions).

Non-totally literal Sprytes require 1 word preamble. Totally literal Sprytes require 2 words of preamble. These preamble words may be located at the end of the SCoB words (but before the PIP) or at the start of the image data. The normal location for these words is at the start of the image data, but totally literal Sprytes that are in frame buffer format will want to not damage their rectangular space with 2 extra words. We are using a stand alone bit for the selection just to keep is all simple.

Non-totally literal Sprytes can be compacted to save both memory space and rendering time. Each source scan line of data has its horizontal word size specified as part of the data.

Totally literal Sprytes have a rectangular format that is specified in the preamble of the data.

<END OF TABLE 1.5 >

TABLE 1.6

Spryte Data Preamble Words

First preamble word:

The first preamble word for ALL SPRYTES is the data structure preamble. It contains the data specific control bits for the source data.

| | | | |
|---|---|---|---|
| B31->B28 | = | PRESERVED | for future use. The current hardware will ignore writes to these bits and return zero on read. |
| B27->B21 | = | Reserved, set to 0. | |
| B20 | = | PACKED | This is identical to the PACKED bit in the SCoB |
| B19->B16 | = | Reserved, set to 0. | |
| B15->B6 | = | VCNT | Vertical number of source data lines in this image data −1. (10 bits) |
| B5 | = | Reserved | set to 0. |
| B4 | = | LINEAR | 0=use PIP for generating IPN output of IPS unit, 1=use PIP for outputting IPN |
| B3 | = | REP8 | 1=replicate the bits in the linear 8 Spryte, 0=fill with 0 |
| B2->B0 | = | BPP | bits/pixel, pixel type |

PRESERVED bits are currently ignored but someday may be used. It is required that the software correctly create these bits. The current hardware will not check that you did it right.

VCNT is loaded into a hardware counter in the Spryte requestor that is decremented at the end of the fetching of each source scan line of data. When the count is at −1, there are no more source lines of data in the object. Note that Spryte processing does not end here, this is merely one of the events that is required to end a Spryte. VCNT = line count −1.

An initial value of −1 for VCNT will cause a REAL BIG Spryte to be fetched. Sorry, there is no 'zero line count' value.

The LINEAR bit only applies when the BPP type is 8 bits per pixel or 16 bits per pixel. In those cases, there are enough PIN bits to provide a 15 bit IPN without using the PIP. Since the PIN bits are spread linearly across the IPN,

TABLE 1.6-continued and it will result in a linear translation from PIN to IPN, the mode is called 'LINEAR'. The only 2 valid uses are for LINEAR 8 and LINEAR 16 (as opposed to 'normal' 8 or 16).

The REP8 bit only has an effect in the 8 bit source data size.
The BPP control bits decode as follows:

| BPP | Data Size | PIP DMA Size | IPN Trans Bits | D-bit | R-Mul | G-Mul | B-Mul |
|---|---|---|---|---|---|---|---|
| 0 = | reserved | 4 PIP words | Reserved,(?) | (?) | 0 | 0 | 0 |
| 1 = | 1 bit | 4 PIP words | PIN[0] | PIP[15] | 0 | 0 | 0 |
| 2 = | 2 bit | 4 PIP words | PIN[1..0] | PIP[15] | 0 | 0 | 0 |
| 3 = | 4 bit | 8 PIP words | PIN[3..0] | PIP[15] | 0 | 0 | 0 |
| 4 = | 6 bit | 16 PIP words | PIN[5..0] | PIN[5] | 0 | 0 | 0 |
| 5 = | 8 bit | 16 PIP words | PIN[7..0] | PIP[15] | PIN[7..5] | PIN[7..5] | PIN[7..5] |
| 6 = | 16 bit | 16 PIP words | PIN[14..0] | PIN[15] | PIN[13..11] | PIN[10..8] | PIN[7..5] |
| 7 = | reserved | 16 PIP words | Reserved,(?) | (?) | 0 | 0 | 0 |

Second preamble word:

If the PACKED bit (in the SCoB) is '0', then the source data is totally literal. For totally literal Sprytes, there is a second preamble word. It contains the horizontal pixel count for each line of the source data and the word offset from one line of source data to the next. It also contains the other special bits needed for totally literal Sprytes. Note that these bits are only valid while the totally literal Spryte is being rendered. These bits are not used ...GATED AWAY... when the current Spryte is not totally literal.

B31->B24 = WOFFSET(8). Word offset from one line of data to the
          next (−2) (8 bits).
          bits 23->16 of offset are set to 0.
B25->B16 = WOFFSET(10). Word offset from one line of data to the
          next (−2) (10 bits).
          bits 31->26 of offset are set to 0.
B15      = Reserved, set to 0.
B14      = NOSWAP 1=disable the SWAPHV bit from the general
          Spryte control word.
B13->B12 = TLLSBIPN PPMP blue LSB source. 0=0, 1=IPN[0],
          2=IPN[4], 3=IPN[5].
B11      = LRFORM Left/right format.
B10->B0  = TLHPCNT Horizontal pixel count (−1) (11 bits).

The TLLSB bits perform the same function that the IPNLSB bits perform in normal Sprytes.

If LRFORM=1, the source data has the frame buffer format of the screen as a source format. Vertically adjacent pixels in the rectangular display space are horizontally adjacent in the 2 halves of a memory word. This is useful for 16 BPP totally literal. The unpacker will disable the 'B' FIFO data requests and alternately place pixels from the source into both FIFOs. Left 16 bits go to 'A' FIFO, right 16 bits go to 'A' FIFO. The data requests for 'A' FIFO will be made in a request 'pair' to insure the reduction of page breaks and '6 tick latencies'. The hardware will lock the corner engines (regardless of the LCE bit).

TLHPCNT is the number of pixels in the horizontal dimension (−1). This is the number of pixels that will be attempted to be rendered for each horizontal line of the Spryte. This value is used by the data unpacker. A '0' in the value will attempt 1 pixel. A '−1' in the value will attempt many pixels. There is no 'zero pixel count' value.

WOFFSET is the offset in words of memory from the start of one line of data to the start of the next line (−2). If the BPP for this Spryte is 8 or 16, use WOFFSET(10), else use WOFFSET(8). This number is a zero for the minimum sized Spryte (2 words).

By arranging WOFFSET and TLHPCNT correctly, you can extract a rectangular area of data our of a larger sized rectangular area of data.

The DMA engine will also use WOFFSET as the length value in the normal data fetch process. If WOFFSET and TLHPCNT are set badly, WOFFSET may expire first and the DMA engine will not cope properly.

<END OF TABLE 1.6>

TABLE 1.7

Spryte Packed Data Formats

Offset

The first one or two bytes are the word offset from the start of this line of source data to the start of the next line of data (−2). In Sprytes with BPP of 6 or less, only 1 byte (bits 31->16) of offset are used. However, the actual offset has a maximum size of 10 bits. The rest of the bits in the 2 bytes are set to 0. 10 bits of word offset is 2048 pixels at 16BPP. 8 bits of word offset at 6 BPP is 1365 pixels. The requirement is 1280 pixels.

This offset is used by the DMA controller to both calculate the start

TABLE 1.7-continued of the next line of data (by adding it to the start of the current line), and to set
the maximum length (by subtracting 1 and placing it in the DMA length register)
of the current DMA transfer.
        This offset value (1 or 2 bytes) is not used by the data unpacker. It
will arrive at the data unpacker at the start of each line of a packed Spryte and
must be discarded.
Control byte and PIN data:

The next data after the offset is comprised of 1 control byte and 0 or more bits of
PIN data. The number of bits used for each PIN is specified by BPP.
        The control byte consists of a 2 bit code and a 6 bit count:

| | |
|---|---|
| 00 'xxxxxx'= | end of line, xxxxxx need not be present |
| 01 'count'= | literal PINs for 'count+1' |
| 10 'count'= | Defined 'transparent' for 'count+1' |
| 11 'count'= | packed 'PIN' for 'count+1' |

The 'transparent' definition will actually output a 'transparent' bit
from the unpacker. This will cause the remainder of the pixel processing pipe
to ignore this pixel. For safety purposes, we will set the data value at this time
to be zero for possible use by the IPS for the D-Mode selector. It probably
will not be seen by the IPS, but we are not sure.
                            <END OF TABLE 1.7>

TABLE 1.8

Spryte Render Stopping and Starting

The Spryte rendering process is started from the CPU by writing a meaningless
value to the 'SPRSTRT' address in the memory address manipulator chip
(MAMC). This sets the 'Spryte-ON' flipflop. Writing to SPRSTART while the
'Spryte-ON' flipflop is already on will have no effect at all. BUT DON'T DO IT.
The race condition of Spryte just now ending and you just now writing is not
preventable.
        A start is always a 'cold' start. Previously running Spryte things have
been canceled. It is required that the software has setup the data in memory and
the first SCoB address in the DMA stack correctly. The SYSTEM WILL CRASH
if the Spryte data or the first SCoB address are faulty.
        The Spryte process is stopped cold when the CPU writes to
'SPRSTOP'. All intermediate states of the engines have been RESET. The data
pointers are now WRONG. Spryte processing is dead. Except, of course, for the
SPRPAUS flipflop.
        When the Spryte engine is completely finished with all of its functions
including sending the last of the rendered data to memory, it will reset its Spryte-
ON flipflop.
        Spryte processing is not overlapped in the hardware. One Spryte is
allowed to totally complete prior to starting the next Spryte in the list. This total
completion includes the processing of trailing transparent pixels and the outputting
of the last data values to memory.
        The CPU can request that the Spryte rendering engine stop operating
at the end of the current Spryte but not reset itself by writing to 'SPRPAUS'.
This will set a 'SPRPAUS' flipflop that will cause the Spryte rendering engine to
set its 'PAUSE' flipflop at the end of the current Spryte. When the PAUSE
flipflop is set by this mechanism (not by other means), the SPRPAUS flipflop will
be cleared. The SPRPAUS event is only a one shot thing. Obviously this can
only be done if the CPU already has access to the system bus. SPRPAUS can be
set by the CPU even if the Spryte engine is off.
        When an interrupt is present, the PAUSE flipflop is held in a 'set'
condition. This will allow the Spryte rendering engine to pause cleanly and allow
the CPU to notice the interrupt.
        The CPU can reset the PAUSE flipflop by writing to 'SPRCNTU'. If
the Spryte engine was on but paused it will now continue. If not, it won't. This is
also when the CPU might avail itself of the SPRPAUS function.
        Once a render process has started, the CPU is effectively asleep.
Nothing has actually been done to the CPU, it just can't get any cycles on the
system bus. When the CPU finally does get some cycles, it needs to decide why
and service the situation. The reasons it got a cycle are that an interrupt is
present, or that the Spryte engine is paused or done, or somehow, the bus has
temporarily become available. After servicing the interrupt or CPU requested
Spryte pause, it will be up to the CPU to then decide whether or not to continue
the render process. The CPU can determine the status of the render process by
reading the appropriate status bit(s).
        If the Spryte rendering engine is on but not paused, the CPU should
just sit in its status bit check loop. This is a temporary situation and will soon
change.

TABLE 1.8-continued

If the engine is on and paused, the CPU could just issue the SPRCNTU. If there are no Sprytes left, the Spryte engine will turn itself off and no harm done.

If on and paused and at end of current Spryte, then the CPU can use the Spryte rendering engine for its purpose without fear of damaging a Spryte in process.

<END OF TABLE 1.8>

Some of the descriptors in the above Tables 1.0–1.8 are self-explanatory, the meaning of others will become apparent in due course.

Note that the SCoB data structure (Table 1.0) includes a PPMP control word (PPMPC). This 32 bit control word is routed out of memory 120 and split into two halves.

FIG. 1B shows the two PPMC halves of SCoB 126 as signals PPMPCa and PPMPCb. These are conveyed as indicated by data-transfer line 117 and loaded into respective first and second PPMP control registers, CRA and CRB (131 and 132 respectively). A PPMP control multiplexer (CMUX) 133 selects one of the PPMPa and PPMPCb half-words that have been prestored in registers 131 and 132 and forwards the selected PPMPC half-word to the Pen and Palette Manipulation Processor (PPMP) 200.

Note that the FLAGS word within the SCoB data structure includes a D-mode override field (DOVER). This 2 bit-wide control field is also shown in FIG. 1B as being routed out of memory 120 by way of data-transfer line 117 for storage in an external register (not shown) and application to the select control of a 4-input multiplexer (DMUX) 134. The output of DMUX 134 drives the select control of the PPMP control multiplexer, CMUX 133.

A dynamic select-control bit (D-bit) which develops on a soon-to-be described Source-A bus couples to a first input of DMUX 134 and passes through DMUX 134 to control CMUX 133 when DOVER=00. This condition is referred to as D-mode. In D-mode, the D-bit of the SRC-A bus dynamically selects one or the other of the A and B inputs of CMUX 133 to be the output of that multiplexer 133. In such a case, the data which arrives at the SRC-A input side of the PMPP unit 200 (from IPS unit 103, FIG. 1A) can dynamically alternate the PMPP control word that is then used to control operations within the PMPP unit 200.

In addition to the D-bit, two other inputs of DMUX 134 respectively receive a logic zero ("0") and a logic one ("1"). When DOVER=10, the logic zero is applied to the control terminal of CMUX 133, and this forces the A-input of CMUX 133 onto its output. When DOVER=11, the logic one is applied to CMUX 133, and this forces the B-input of CMUX 133 onto its output. When DOVER=01, another signal (not yet specified) can be applied to the control terminal of CMUX 133.

The color-mapping section of IPAD system 100 is referred to here as a color-engine 170 (shown beginning near the top of FIG. 1A). The color-engine 170 has a pipelined architecture. One or more source color-defining signals (e.g., those carried by data-transfer lines 111, 112 and 113 in FIG. 1A) enter upstream ends of the pipelined architecture of engine 170. The source color-defining signals are transformed as they flow downstream through the pipelined engine 170. The PPMP unit 200 (FIG. 1B) defines a midstream part of the overall pipelined architecture of color-engine 170.

The data-flow paths of the color-engine 170 are now described in more detail.

Referring to the non-literal image definition storing region 121 of VRAM 120, source pixel color and/or shade and/or intensity information is stored in a compressed format within this region 121 in order to minimize the amount of storage area consumed by region 121. This helps to minimize the size and cost of VRAM 120. It also reduces the amount of time needed to transfer 111 such data out of VRAM 120 over D-bus 120d and into a first upstream unit 102 of color-engine 170. The first upstream unit, unpacking unit 102, includes a front-end capture FIFO 102a which captures the transferred data off the D-bus 120d, stores it and shifts it downstream for subsequent decompression by an internal decompression sequencer (not shown) of unit 102.

A run-length (RL) compression scheme is utilized for encoding the data held in nonliteral storage region 121. If a particular scan line of the video display 160 is to include a horizontal sequence of, for example, two pixels having a particular red shade (R), three following pixels having a particular green shade (G), five subsequent pixels having a particular mixed color shade (M), and 100 further pixels containing a particular blue shade (B), with the first red shade (R) pixel being positioned seven places to the right of a reference point (e.g., 127), then compressed code is programmed into region 121 specifying each shade (R, G, M) or transparency (T) in conjunction with a repeat value specifying the number of sequential pixels that are to be colored with that shade or treated as a transparency (e.g. 7T 2R 3G 5M 100B). The end of such a source-image scan-line is indicated either by an EOL code stored within VRAM 120 or a length count stored in a counter (not shown). (This will vary depending on the BBP type chosen for the encoded data.)

When the compressed image information (e.g. 7T 2R 3G 5M 100B) is designated as being required for rendering into a displayable VRAM region (e.g., 123a or 123b), it is routed (111, 101a) from its non-literal image-defining storage region (e.g., 121) to unpacking unit 102. The routing (101a) is controlled by one of the plural geometry-control engines 101c inside the memory address manipulator chip (MAMC) 101. The geometry-control engines 101c determine which locations of VRAM 120 will be accessed one after the next and when each specific location is to be accessed. In the illustrated example of FIG. 1A, the implied source-A router 101a is conceptually shown to be fetching packed data (e.g., 7T,2R,3G,5M,100B,EOL) from region 121 as indicated by data-transfer line 111.

Unpacking unit 102 converts the stream of non-literal image information (e.g. 2R 3G 5M 100B) that it receives, from a compressed format in which one—and usually more—pixels are defined by each 32-bit word delivered over D-bus 120d, into a somewhat less compressed stream of color/shade definitions. These decompressed color/shade definitions are represented by a stream of signals that move out of the unpacking unit 102 over a plurality of system clock ticks. The decompressed color/shade defining signals are referred to here as PIN's (PEN Index Numbers).

Each PIN signal represents a particular color and/or shading that is to be "initially" assigned to a corresponding pixel of a destination image area. (The assignment is provisional and subject to many possible changes as the signal moves downstream through color-engine 170 and as corresponding geometry-defining signals (not shown) move downstream in parallel through the geometry-control engines 101c.)

As seen in FIG. 1A, the "2R" non-literal code is now decompressed into a serial sequence of two separate "R" shade specifications. The "3G" non-literal code is now decompressed into three separate "G" shade specifications, and so forth.

When a given spryte (e.g. tbr-Spryte 121a) is being rendered, the individual decompressed shade specifications (R R G G G M M . . . ) that are derived from that particular spryte (e.g. 121a) each have the same bit length and each such specification defines the color/shade of a corresponding source pixel. When different sprytes are considered, however, the bit-widths of the individual decompressed shade specifications of each given spryte can be set according to a number of different Bits Per source Pixel (BPP) definitions. The IPAD system 100 of FIGS. 1A, 1B allows a BPP of anywhere from one to sixteen bits per source pixel. The decompressed R code, for example, might be 4 bits wide when derived form one spryte and 6 bits wide when derived from a different source spryte. The allowed PIN bit widths of one embodiment of the invention include: 1, 2, 4, 6, 8 and 16 bits per pixel.

The decompressed PIN signals are next supplied to a Indexed PIN Selecting unit (IPS) 103. The IPS unit 103 expands the codes from their respective, variable length formats (which are relatively short if BPP<16) to a longer 29-bit, fixed-length format. In so doing, the IPS unit 103 can also map the received PIN codes from one palette space into another (usually broader) palette space. This lets received PIN codes which are, say 4 bits wide each, represent points in a shading spectrum having much more than $2^4$ (=16) shades. However, the received 4-bit wide PIN codes can represent no more than $2^4$ (=16) different shades selected from the second palette space.

The IPS unit 103 can also convert received codes so that two input codes that initially represent two different colors are converted into an output code that represents a same color. When the latter palette mapping is undone back to one where the outputs are again different, image areas that displayed as having the same color suddenly take on different colors. The mapping function also makes it possible to convert any given color or shade code into a transparency code, so that an image area that is to be solidly colored can first be displayed as transparent. (This effect is useful for example, to show mud splattered onto a windshield. The splattered areas are first transparent and then they are suddenly mud colored.)

A PIN Index Palette unit (PIP) 104 is included within IPS unit 103 for performing this palette mapping function. The PIP 104 is a 32-word deep, 16-bit wide register stack which receives up to five of its address bits from the PIN's and if the PIN is less than five bits long, further address bits are derived from a preselected SCoB (e.g. 125) within the VRAM 120.

For each received PIN code, the PIP 104 outputs a 29-bit wide pixel shading code which is referred to as an IPN (Initial PEN Number). The "initial" portion of the IPN acronym once again indicates here that each pixel shading value is subject to further change as it flows further downstream into a subsequent FIFO (first-in, first-out buffer) 105a and then through the Pen and Palette Manipulation Processor (PPMP) 200. (First-in, first-out buffer 105a is also referred to as the A-FIFO 105a because its output is connected to a Source-A bus that supplies data to the PPMP 200.)

The structure of an individual IPN code is shown at 155. Its 29-bit width is divided out into a plurality of fields having respective widths of 1, 5, 5, 5, 1, 3, 3, 3, 1, 2 bits.

The most-significant one of the illustrated bits (leftmost bit, B28) contains the earlier-mentioned D-bit.

The next five bits (B27:23) contain a code representing an initial red gun intensity ($R_I$). The next five bits (B22:18) contain a code representing an initial green gun intensity ($G_I$). The next five bits (B17:13) represent an initial blue gun intensity ($B_I$).

The next bit (B12) of the IPN code word 155 defines the earlier-mentioned transparency code. It is referred to as the T-bit. The T-bit is stripped out of the data output flow of IPS unit 103 and diverted to the geometry-control engines 101c. When the T-bit is set to logic one ("1"), it instructs the memory address manipulator chip (MAMC) 101 to NOT overwrite a color code in a corresponding pixel of the destination grid with a new color. The original code in the destination area (e.g., 123b) is left unchanged and this creates the impression that the destination pixel has been covered by nothing more than a perfect transparency. When T-bit is set false (to "0") it allows the MAMC 101 to proceed with writing to memory. Other mechanisms however may block the write operation for other reasons (e.g., the write is outside an allowed boundary).

Bits B11:9 of the IPN data structure 155 define a 3-bit wide alternate multiplier ($MUL_R$) that is used by an R-pipe section 201 of the PPMP 200. Bits B8:6 define a 3-bit wide alternate multiplier ($MUL_G$) that is used by a G-pipe section 202 of the PPMP 200. Bits B5:3 define an alternate multiplier ($MUL_B$) that is used by a B-pipe section 203 of the PPMP 200.

Bit B2 defines an R-mode (R/W) signal which, when active, tells the DMA hardware that a special "read" operation is to be performed within a stream of memory write operations. The special read operation initiated by the active R/W signal invokes the loading of a color code from a totally literal frame buffer region (such as 123a or more preferably the cFB, 123b) into a 16-bit wide FIFO-B 105b of the color-engine 170. During the same time, the signal which sent the active R/W signal wraps back from the downstream end of FIFO-A 105a, through a "DOLO" register 106 (which provides a 1 clock tick delay) into an upstream end of IPS unit 103. The wrapped-back signal then returns through IPS unit 103 to an upstream end of FIFO-A 105a. The wrap-back delay is adjusted so that the returned, R-mode invoking signal enters FIFO-A 105a roughly at the same time that the other color signal, that had been fetched from memory because the R/W bit was active in the first signal, enters FIFO-B 105b. The two signals then exit in synchronism from the respective downstream ends of FIFO-A 105a and FIFO-B 105b for processing within PPMP unit 200.

The last two bits (B1:0) of the illustrated IPN data structure 155 are respective vertical and horizontal subposition bits which are used by the CLUT/INT unit 140 to perform a pre-display interpolation process.

Although specific bit positions (B28:0) have been recited above for the IPN data structure 155, it is to be understood that the bit positions can be varied as desired. The basic idea is to show that 18 bits define functional portions D, $R_I$, $G_I$, $B_I$ and SP, in the 29-bit wide IPN data structure 155, and that a next-described data structure 156 has a roughly similar 16 bit organization that includes corresponding functional portions: $SP_V$, $R_O$, $G_O$ $B_O$ and $SP_H$.

Although the IPN data structure 155 is 29-bits wide, the transparency-indicating bit (T-bit) is stripped off and sent to the geometry-control engines 101c before the remainder of the IPN bits enter FIFO-A 105a. FIFO-A 105a is therefor only 28-bits wide. At the downstream end of FIFO-A 105a, the R-mode (R/W) bit is stripped off and wrapped back to DOLO register 106 and MAMC 101. The IPN signal portion which thereafter enters PPMP unit 200 (FIG. 1B) is thus only 27-bits wide.

At the same time that IPN's accumulate in and/or move out from the A-FIFO (105a), other pixel-defining code signals, referred to as totally-literal PEN's ("tPEN's" for short) accumulate in and thereafter flow out of corresponding B-FIFO (105b) into PPMP unit 200. The 16-bit wide tPEN data signals that appear at the input end of the B-FIFO (105b) are selected by the memory address manipulator chip (MAMC) 101.

R-mode is not necessarily the only way of loading B-FIFO 105b. Implied source-B router 101b is shown to indicate conceptually that tPEN data can come from any desired region of VRAM 120. Preferably, the tPEN data entering FIFO-B 105b should have functional portions: $SP_V$, $R_O$, $G_O$ $B_O$ and $SP_H$, arranged as shown at 156 with respective bit-widths 1, 5, 5, 5or4, 0or1.

The respective outputs of first-in/first-out buffers 105a and 105b are synchronized to the system clock (CLK) and respective signals that move simultaneously out of FIFO-A 105a and FIFO-B 105b thereafter march side-by-side, in a timing sense, through pipelined sections of the subsequent PPMP unit 200. Upstream signals which enter the input sides of respective FIFO's 105a and 105b do not have to be time-aligned to one another. It is the order in which they accumulate at the downstream ends of respective FIFO's 105a and 105b that determines what FIFO-A output signal will march together with what FIFO-B output signal through PPMP unit 200.

Referring to the tPEN data structure shown at 156, a vertical subposition bit $SP_V$ occupies the most-significant bit position (B15) of the 16 tPEN code bits. A red-shading part ($R_O$) consumes the next 5 of the 16 tPEN code bits. A green-shading part ($G_O$) consumes another 5 of the tPEN code bits. A blue-shading part ($B_O$) consumes either 4 or 5 of the tPEN code bits depending on whether a following, horizontal subposition part ($SP_H$) of the tPEN code 156 that, depending on mode, consumes either 1 or 0 bits.

The downstream CLUT/INT unit 140 can operate in either a mode which requires 2 SP bits to be varying on a pixel-by-pixel basis or a mode which needs only one SP bit changing on a pixel-by-pixel basis. If the 2 SP bits mode is chosen, the $SP_H$ portion of tPEN signal 156 is 1-bit wide rather than zero bits wide, and the 4-bit $B_O$ portion of tPEN data structure 156 is padded further downstream, as it enters PPMP unit 200, with a least-significant logic zero ("0") to make the blue field ($B_O$) the same bit-width as the $R_O$ and $G_O$ fields. If the 1-SP bit mode is chosen, the $B_O$ field is a full 5-bits wide and the $SP_H$ bit is not present in the tPEN data structure 156.

Each tPEN signal 156 preferably starts its life as a totally-literal PEN code stored in a totally-literal region (e.g. 123a or 123b) of VRAM 120. (The format can be TLFB or TLNF.) The implied source-B router 101b fetches tPEN's from a box-shaped area (e.g., X1, or X2 or X3) of the literal-image defining regions (e.g., 123a, 123b) in accordance with commands issued by the memory address manipulator chip (MAMC) 101. Control signals sent from the memory address manipulator chip (MAMC) 101 determine the source address.

The source address can be anywhere in VRAM 120. Regardless of the source region, the output of FIFO-B 105b is referred to as the secondary or "Source-B" input signal of PPMP unit 200 and the output of FIFO-A 105a is referred to as the primary or "Source-A" input signal of PPMP unit 200.

While any memory region of VRAM 120 can function as the Source-B region, certain regions of VRAM 120 are better suited to serve as the Source-B region than others. Nonliteral image region 121 for example, is not well suited because its image codes are compressed. Image data from nonliteral image region 121 is preferably routed into the Source-A side of PPMP unit 200 by way of unpacking unit 102. (The unpacking unit 102, incidentally, can receive literal data by setting its BPP value to 16 bits per pixel.)

An example of a more-suited source area for the input of FIFO-B 105b is a box-shaped spryte (e.g. X1) within totally-literal region 123a, as indicated by data-transfer line 113. Another example of a more suited source area is box-shaped spryte X3 within region 123b, as indicated by data-transfer line 114. If box-shaped spryte X3 within region 123b serves as tPEN signal source and region 123b also serves as the destination area into which color-output codes (oPEN's) of PPMP unit 200 are to be written, a recursive condition can be established in which the output of one operation of PPMP unit 200 becomes the Source-B input for a subsequent operation of the PPMP unit 200.

Referring to FIG. 1B, the IPN (Source-A) and tPEN (Source-B) code signals are simultaneously output from their respective A- and B-FIFO's (105a and 105b) at a system clock rate of for example, 25 MHz, and placed onto respective Source-A and Source-B input buses of the PPMP unit 200. The memory address manipulator chip (MAMC) 101 determines which IPN code signal will be output concurrently with each tPEN code signal.

The two subposition bits, SP, of IPN data structure 155 and/or the one or two subposition bits, $SP_V$ and/or $SP_H$, of tPEN data structure 156 are not altered by PPMP unit 200, but just the same, two pre-selected ones of these bits step through an ancillary pipeline section 204 of the PPMP 200 so that they remain in synchronized step with the corresponding color code signals that step through pipelined sections 201 (R), 202 (G) and 203 (B) of PPMP unit 200.

Depending on mode, one or two SP bits output by ancillary pipeline section 204 merge further downstream into a 16-bit wide oPEN signal that is output by the PPMP unit 200 and stored (116 or 115) back into memory 120. The stored one or two SP bits are later retrieved by the CLUT/INT unit 140 and used to form the ultimately displayed image on video display unit 160.

When PPMP operations complete, fifteen or fourteen (depending on whether the SP mode is two or one subposition bits per pixel) of the 16-bit wide, output-PEN code (oPEN) signal which emerges from the PPMP unit 200 will represent one, or the other, or a merged combination, of each of the IPN (Source-A) and tPEN (Source-B) codes that entered the PPMP unit 200 together. The fifteen or fourteen oPEN bits are subdivided into R, G and B groups of bit-widths, 5, 5 and 5/4 in accordance with the totally-literal data structure shown at 156 (FIG. 1A). (The same data structure of 1,5,5,5/4,0/1 bits is also used for the tPEN signals entering FIFO-B 105b thereby allowing recursive operations.) These R, G and B output groups are produced by the respective R, G, and B pipe sections, 201, 202 and 203 of PPMP 200.

The PPMP produced oPEN signals are next routed by a subsequent, "corner-selecting" demultiplexer 108 into one of a plurality of 16-bit wide, oPEN-codes storing registers 109. The corner-selecting demultiplexer 108 and the set of codes storing registers 109 function as a means of determining specifically where in a designated destination region (e.g., 123b) of VRAM 120, the produced oPEN codes will be stored. The details of this output routing mechanism are not germane to understanding the functions of PPMP unit 200. It is sufficient to note here that the implied destination router 101d preferably routes and writes the oPEN codes to a preselected, totally-literal (TLFB) destination area (e.g. 123a or 123b) within the VRAM 120. Control signals sent from the geometry-control engines 101c determine whether and which specific destination pixel or pixels will be "over-painted" with the color represented by each produced oPEN signal.

One possible destination for the oPEN write operations is the earlier-mentioned, nonbox-shaped region RY3 within region 123b, as indicated by data-transfer line 116. Another possible destination for the written back oPEN codes is region RY2 (FIG. 1A) within totally-literal region 123a, as indicated by data-transfer line 115.

From a general perspective, any appropriately-sized region of VRAM 120 can serve as one or the other or both of the Source-A and Source-B data-supplying regions. A same or other region can serve as the destination area into which the PPMP produced oPEN signals are written. Note that a recursive form of spryte rendition is made possible by setting the destination area of the PPMP output codes to be the same as one or both the source areas (Source-A or Source-B) that supply input data to the PPMP unit 200. (By way of example, implied source-B router 101b would follow data-transfer line 114 to fetch tPEN codes from box-shaped region X3 while the implied destination router 101d would follow data-transfer line 116 to overwrite oPEN codes into part or all of the same box-shaped region X3. When T-bits are activated at the output of IPS unit 103, the over-write or "paint-over" region can be uniquely shaped as indicated by the non-rectangular, rendered area, RY3.) Multiple, cascaded effects such as shadowing and highlighting can then be applied to a single spryte-rendered region (e.g. RY3).

Referring still to the block diagram of the Pen and Palette Manipulation Processor (PPMP) 200 as shown in FIG. 1B, one sees that the PPMP unit 200 comprises three pipelined sections, 201, 202 and 203. These are also referred to hereafter respectively as the R-pipe unit, the G-pipe unit and the B-pipe unit. Each of pipe units 201, 202 and 203 has a similar two-stage internal structure. One exception is the R-pipe unit 201 which includes a black-converter unit 295 (FIG. 2B) not found in the G-pipe and B-pipe units.

Pipelining techniques are used, but not necessary, for the operations of PPMP unit 200 to compensate for delays found in present-day silicon technology. Two ticks of the system clock (25 MHz) have been found to be required when using 0.9 micron CMOS technology for converting an IPN and/or tPEN input signal into a corresponding oPEN output signal. (Faster technologies such as ECL may be used, if desired, to do the same logical operation in one clock cycle.)

The upstream end of the R-pipe unit 201 receives the 5 $R_I$ bits of each IPN signal from the Source-A bus and the 5 $R_O$ bits of each tPEN signal from the Source-B bus. In addition, the upstream end of the R-pipe unit 201 also receives the 3 $MUL_R$-defining bits of each IPN signal from the Source-A bus. G-pipe 202 similarly receives the 5 $G_O$ bits of each tPEN signal, the 5 $G_I$ bits of each IPN signal, and the 3 $MUL_G$-defining bits of each IPN signal. And B-pipe 203 correspondingly receives the 5 $B_O$ bits of each tPEN signal, the 5 $B_I$ bits of each IPN signal, and the 3 $MUL_B$-defining bits of each IPN signal. All three pipes 201–203 receive the PPMP control word (16 bits) output by CMUX 133.

Each of the R, G and B pipes (201, 202, 203) outputs a corresponding 5 bits for use in the resultant oPEN code signal. The data structure shown at 156 (FIG. 1A) is used. The least significant bit of the B-field in the oPEN code is selected, depending on mode, either as the output of the B-pipe unit 203 or another code derived from the B0POS field of the spryte-rendering engine control word. (See above Table 1.4.) The most significant bit B15 of the oPEN code is set in accordance with the B15POS field of the spryte-rendering engine control word. (See above Table 1.4.)

It is to be understood that the three-section structure (201, 202, 203) of PPMP 200 is provided as a matter of convenience for image manipulations operating in a three color-vector space (e.g. R,G,B) rather than as a necessity. Those skilled in the art will appreciate that manipulations in a two color-vector space (e.g., YCC) is also possible, in which case only two a two-section structure (201, 202) for PPMP 200 will suffice. Moreover, if image data is supplied serially rather than as parallel vectors; as is done for example in the Composite Video Broadcast Standard (CVBS), a one-section structure (201) for PPMP 200 will suffice for processing the image data.

Figure 2A:
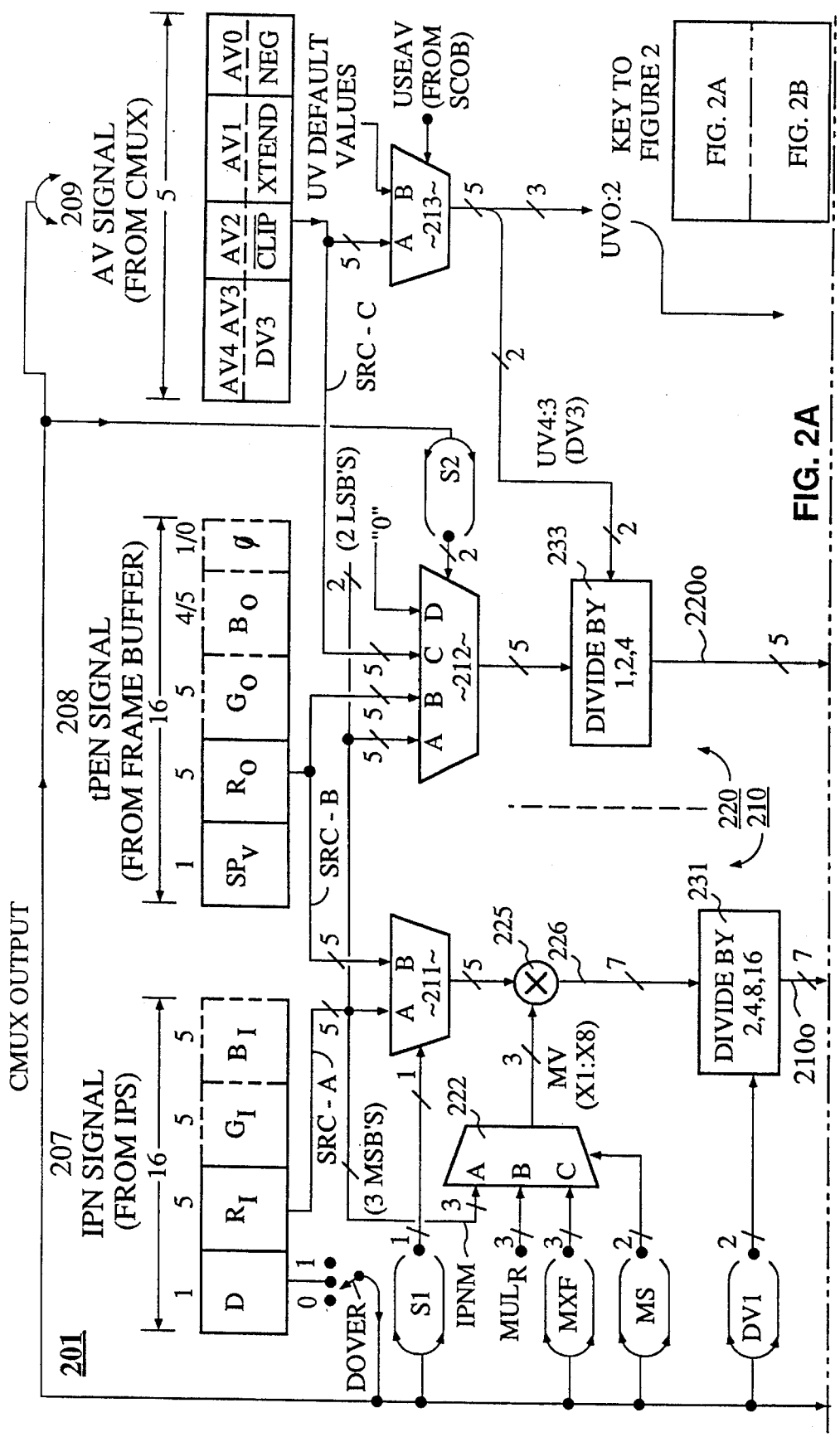
FIG. 2 (composed of subportions 2A and 2B) is a schematic diagram illustrating a vector processing pipeline within the PPMP section of the system shown in FIG. 1.
Figure 2B:
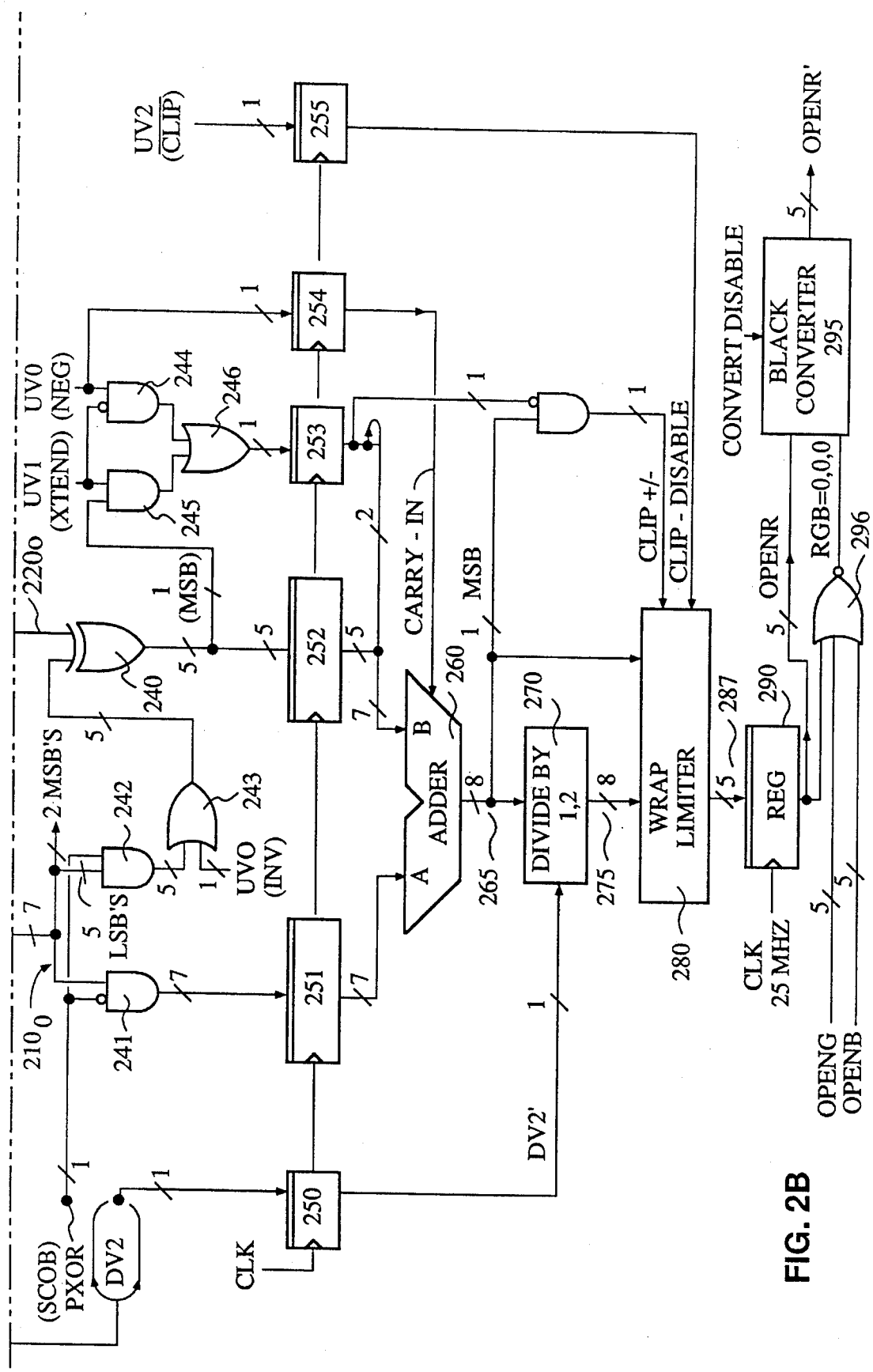

Referring now to FIG. 2 (which is composed of subFIGS. 2A and 2B in accordance with the key), the internal structure of the R-pipe 201 will be described in greater detail. Pipes 202 and 203 have similar structure with the exception that R-related connections are replaced with corresponding G-related and B-related connections and the G and B-pipe units do not include black-detector (NOR gate) 296 and black-converter unit 295 (FIG. 2B).

Referring to FIG. 2A, the R-pipe unit 201 can be visualized as receiving a plurality of control signals at its side (e.g., S1, MXF, MS, etc., which are discussed later) and three input signals at its top. The three top signals are shown in left to right order as: a 16-bit wide portion 207 of the IPN signal; a 16-bit wide tPEN signal portion whose structure is shown at 208; and a 5-bit wide AV signal whose structure is shown at 209.

IPN signal portion 207 is output from the A-FIFO 105a (FIG. 1A) at the same time that tPEN signal portion 208 is output from the B-FIFO 105b. Note that in the case where the $B_O$ field of the tPEN signal starts off in VRAM 120 with only 4 bits, an extra zero is appended at its least significant position to give the $B_O$ field of tPEN signal portion 208 the same 5-bit field width as possessed by the $R_O$ and $G_O$ fields.

The 5-bit wide AV signal 209 comes from CMUX 133 (FIG. 1B) and is part of the 16-bit wide PPMPC control signal output by CMUX 133. (See above Tables 1.2 and 1.3.)

The 5 $R_I$ bits of IPN signal portion 207 are placed on a corresponding 5-bit wide SRC-A bus portion of R-pipe 201. The 5 $R_O$ bits of tPEN signal portion 208 are placed on a corresponding 5-bit wide SRC-B bus portion of R-pipe 201. And the 5-bit wide AV signal 209 is placed on a corresponding SRC-C bus of R-pipe 201. (G-pipe unit 202 and B-pipe unit 203 receive the same 5 bits on their respective SRC-C busses.)

R-pipe unit 201 is comprised of a primary input selector (multiplexer) 211, a secondary input selector (multiplexer) 212, and a third input selector (multiplexer) 213 for receiving the respective input signals of busses SRC-A, SRC-B and SRC-C and routing them in accordance with a supplied set of select control signals, S1, S2 and USEAV.

The R-pipe unit 201 further includes a multiply-factor selector (multiplexer) 222, a multiplier 225, a left-side divider 231, and a right-side divider 233, for performing pre-addition scaling.

Referring to FIG. 2B, the R-pipe unit 201 also includes a set of five exclusive OR gates (represented by one XOR symbol) 240 and ancillary logic 241–246 for performing pre-addition negation or other processing as will be detailed shortly.

A group of pipeline registers 250–255 synchronize the signals entering the second pipeline stage of R-pipe unit 201 with a system clock signal (CLK) before supplying them to a subsequent adding unit 260, third divider 270 and wrap-limiting unit 280. The third divider 270 is provided for performing post-addition scaling. The wrap limiter 280 is provided further downstream for selectively allowing or preventing magnitude wrap-around to occur (out of decimal range 0–31) in the signal output by the adding unit 260. Black-converter unit 295 optionally modifies an R=00000, G=00000, B=00000, output the PPMP unit 200 into an R=00001, G=00000, B=00000, output when special background effects are desired. Register 290 is shown to indicate the timing point at which the output PPMP unit 200 is resynchronized to the next tick of the 25 MHz system clock.

As seen in FIG. 2A, the primary input selector 211 supplies one or the other of the corresponding 5 $R_I$ bits from the SRC-A bus or 5 $R_O$ bits from the SRC-B bus to a first, 5-bit wide input port of digital multiplier 225. A second input port of digital multiplier 225 is 3-bits wide and receives a digital multiplying value (MV) from multiply-factor selector 222. The MV signal represents a multiplying factor in the integer range, one to eight (x1:x8). The output port 226 of multiplier 225 produces a 7-bit wide digital signal representing the 8-bit product of MV and the output of first selector 211, with the least significant bit always forced to zero. (Note that no wire is necessary for the least significant bit because the next stage, left-side divider 231, automatically truncates it.) Multiplier 225 is formed of combinatorial logic circuitry which completes the multiplication in less than one tick of the system clock.

FIGS. 2A and 2B show divided-arrow symbols surrounding and approaching the input nodes of respective signals: S1, MxF, MS, DV1, DV2 (FIG. 2B), S2 (FIG. 2A) and AV. The divided-arrow symbols indicate that the output of CMUX 133 (FIG. 1B) is the source of these symbol-surrounded signals. The 16-bit wide output of CMUX 133 is broken out as follows: S1 (1-bit wide), MxF (3-bits wide), MS (2-bits wide), Dv1 (2-bits wide), S2 (2-bits wide), AV (also called the SRC-C signal, 5-bits wide), and Dv2 (1-bit wide).

Note further that three most-significant ones (3 MSB's) of the five $R_I$ bits received from the SRC-A bus go to the A input port of selector 222. The 3-MSB's of the $R_I$ signal are referred to here as the IPNM signal because they originate from the IPN signal. (Although not shown, in an alternate embodiment the remaining 2-LSB's (least-significant bits) of the $R_I$ signal are used to select a divide factor used by right-side divider 233.)

Also, note that the 3-bit wide $MUL_R$ field of the IPN code signal 155 ($MUL_R$ is labeled as $M_R$ in FIG. 1A) is delivered to the B input port of selector 222.

The output 226 of multiplier 225 is shifted right by one, two, three or four bit positions in divider 231 in accordance with a 2-bit wide left-side divide command signal Dv1 supplied from CMUX 133.

The combination of primary selector 211, multiply-selector 222, multiplier 225, and left-side divider 231 is referred to here as the "left-side pre-addition scaling subcircuit" 210 (or left pre-add subcircuit 210 for short). Its 7-bit wide output is referenced as 210o.

The left pre-add subcircuit 210 can perform a number of interesting image-signal processing functions.

The simplest processing function is selecting either SRC-A or SRC-B to be the primary image source for rendering a particular destination pixel and scaling the value of the input color code (IPN or tPEN) by a scaling factor. For this function, the PPMP control word in the associated SCoB (126, FIG. 1B) is configured with a multiplier selection code (MS) that selects input port C of selector 222. The SCoB multiply factor (MxF) is set to a desired value in the times-1 (x1) through times-8 (x8) range. The Dv1 signal is preferentially set to place divider 231 in a divide by 8 mode. (This allows MxF to select the eight scaling factors: 1/8 through 8/8 without modifying Dv1.) The first selector field, S1, then selects a R pixel-shading signal from one of SRC-A and SRC-B; and the selected field is scaled by the factor, MxF/Dv1=1/8 to 8/8, thereby providing the selected source pixel, accordingly scaled at output 210o of the left-side pre-add subcircuit 210.

It is therefore seen that the output of first-input selector 211 can be scaled by different factors, MxF/Dv1B, simply by programming the appropriate MxF and Dv1B values into the associated SCoB (e.g., 126) of the spryte being rendered. The MxF/Dv1B scaling factor is constant across all three color vectors (R, G, B) when the MS multiplexer control is set to select input port C of multiply-factor selector 222 in all three pipes (201, 202, 203). Such across the board scaling is referred to here as grey-type openacity.

The selection made by first input selector 211 can be switched dynamically at every tick of the system clock (at every machine cycle) by programming a first selection value (e.g., S1=0) in the PPMPCa half-word and a different selection value (e.g., S1=1) in the PPMPCb half-word. The D-bit of the IPN signal 207 is then used as the control for modulating the S1 signal output by CMUX 133. (DOVER is set to 00.)

This is better understood by referring momentarily back to FIG. 1. The PIN's which come out every clock cycle from unpacker 102 define the D-bit of IPN signal 207 on a source pixel-by-source pixel basis. One method of defining the D-bit is by appropriate programming of the PIP unit 104 (which is a look-up RAM) within IPS 103. Suppose, for example, that the D-bit output from IPS unit 103 alternates every one or more machine cycles and it is used to switch the value of primary selector signal S1 between logic one ("1") and logic zero ("0"). The output 210o of the left-side subcircuit will then be a 50%/50% or other "dither-type blend" of the PEN codes alternatively found on the SRC-A and SRC-B signal buses. Note incidentally that the scaling factor, MxF/Dv1, applied to each of the image sources in such a blend can be different because each half-word of the PPMP control word has its own MxF and Dv1 fields.

A more interesting set of effects is imparted to the output video signal when the MS signal is alternated by the D-bit to choose one of input ports A (IPNM) and B ($MUL_R$) in selector 222 as the multiplier value (MV). The corresponding IPNM and $MUL_R$ fields in the IPN signal 207 can then act as source pixel-by-source pixel scaling factors for the $R_I$ field in the tPEN signal 208. At the same time, the $MUL_G$ and, $MUL_B$ fields (not shown in FIG. 2A) interact in the same way with the 3 MSB's of their respective $G_I$ and $B_I$ signals. Scaling then occurs on an independent color-vector-by-color-vector basis. (This effect is referred to as color-type openacity).

Assume, as a further example, that S1 selects input port B of selector 211 and MS selects input port A of selector 222. The three most significant $R_I$ bits of the IPN signal 207 (the IPNM portion) will then act as the multiplying value (MV) for the five $R_O$ bits of the tPEN signal 208. The tPEN signal 208 (Source-B) can represent the image of an object behind a stained glass window, while the IPN signal 207 (Source-A) can represent the stained glass window. If the stained glass window is to function as a filter which attenuates the G and B content of the passed-through image while it accentuates the R content of the passed-through image, the corresponding IPN signal 207 will contain a relatively large R scaling factor and relative small G and B scaling factors.

Such cross-source manipulation (where Source-A manipulates the signal of Source-B or vice versa) is referred to here as "doloresizing". Note that to obtain reliably repeatable doloresizing, the desired Source-A and Source-B signals need to arrive in repeatable synchronism from the outputs of respective first-in/first-out units 105a and 105b. The Dolo register 106 and R-mode bit of FIG. 1A are used to provide self-initiated synchronism. (An active R/W bit in an IPN signal self-initiates the fetch of a corresponding tPEN signal and the wrap-back through register 106.)

In place of using the $R_I$, $G_I$ and $B_I$ fields of the IPN data structure 155 as cross-multipliers for the corresponding $R_O$, $G_O$ and $B_O$ fields of the tPEN data structure 156, one could use the $MUL_R$ $MUL_G$ and $MUL_B$ signals of the IPN data structure 155 as alternate 3-bit wide multiplying factors.

Returning focus to FIG. 2A, the left-side divide-by scaling factor Dv1 can be similarly defined by the contents of the IPN signal portion 207, on a source pixel-by-source pixel basis and/or color-by-color basis (R, G, B). When DOVER= 00, the D-bit controls the CMUX 133 and thus determines whether the Dv1 signal will be sourced from the CRA register 131 or CRB register 132.

To summarize the effects discussed thus far, when a single scaling factor is used across all three color vectors (R, G, B), the scaling effect is referred to as grey openacity. When scaling is applied on a color-by-color basis, this is referred to as color openacity. When one image shading value on the Source-A or Source-B side serves as the scaling factor for a second image shading value on the other of the Source-A and Source-B sides, this is referred to as a doloresizing operation.

When the D-bit is used for dynamically switching the selection made by the CMUX 133 on a source pixel-by-source pixel basis, this is referred to as a D-mode operation. In D-mode operations, one or more corresponding fields in the two PPMP control half-words respectively stored in registers CRA 131 and CRB 132 (FIG. 1B) are set differently while remaining corresponding fields of the two PPMPC half-words are set to be the same. The D-bit is then used to switch between those PPMPC fields that are set differently in the two half-words.

At the same time that the left-side subcircuit 210 is developing the 7-bit wide output signal 210o, a corresponding right-side subcircuit 220 is developing a pre-scaled, 5-bit wide, output signal 220o. Right-side subcircuit 220 is comprised of secondary input selector (multiplexer) 212, third input selector (multiplexer) 213 and right-side divider 233.

The S2 selection signal (which is supplied by CMUX 133) is used to select one of four basic sources as the output of secondary input selector 212. These sources are: (a) the 5-bit $R_I$ color field from the IPN signal 207; (b) the 5-bit $R_O$ color field from the tPEN signal 208; (c) the 5-bit AV signal 209; and (d) a 5-bit wide zero signal. (More accurately, there is no "0" input port D on multiplexer 212. Instead, a select of that hypothetical port forces a default zero on the output of multiplexer 212.)

In addition to these basic selections for the secondary input selector 212, when D-mode operations are used, the D-bit may be used to switch one or both of the AV signal 209 and S2 signal on a source pixel-by-source pixel basis and on an across-the-colors basis.

The 5-bit wide output of secondary input selector 212 connects to right-side divider 233. Right-side divider 233 receives a 2-bit wide DV3 control signal (or more precisely, bits UV4 and UV3 of the UV0:4 signal output by third input selector 213) which is also referred to as the UV4:3 signal. The received UV4:3 instructs the divider to shift the output of selector 212 right by zero, one or two bit positions and thereby effect a divide by 1, 2 or 4 on the output of the secondary input selector 212. The right-side addition-prescaled signal output by the right-side divider 233 is referenced as 220o. (It is the output of right-side subcircuit 220.)

As mentioned, the DV3 control signal is formed from two bits (UV3 and UV4) of a 5-bit wide UV signal output by the third input signal selector 213. When the USEAV signal of the active SCoB is high (true), selector 213 uses the AV signal 209 as its output. When the USEAV signal is low (false), selector 213 uses a set of fixed default values (e.g., all zeroes) for UV as its output.

In an unshown variation of the circuit, selector 213 is expanded to have three input ports and the two least significant bits (2 LSB's) of the $R_I$ signal are coupled to the third input port. A decoder (not shown) which is responsive to unique code combinations present on the USEAV and SRC-C lines controls the selection of this expanded version (not shown) of selector 213 to determine when the two least significant bits of the $R_I$ signal will define the UV3 and UV4 bits.

Once generated, the left-side and right-side prescaled signals, 210o and 220o, can be merged in a number of ways including, adding them together, subtracting one from the other and developing an exclusive OR of parts of the two signals.

Referring to FIG. 2B, seven AND gates, each with one inverting and one noninverting input are provided as indicated at 241. The noninverting input of each of AND gates 241 is connected to a respective one of the seven output lines of divider 231 (signal 220o). The inverting inputs of all seven AND gates 241 are connected to receive an exclusive-OR permission signal, PXOR from the associate SCoB. When PXOR is at logic low (0=false), the left-side prescaled signal 210o passes through AND gates 241 to a 7-bit wide pipeline register 251. When PXOR is at logic high (1=true), AND gates 241 output a zero signal to pipeline register 251.

Five further AND gates, each with two noninverting inputs are provided as indicated at 242. A first noninverting input of each of AND gates 242 is connected to a respective one of the five least-significant output lines (5 LSB's) of divider 231. (The remaining 2 MSB's are not connected to AND gates 242.) The second noninverting inputs of all five AND gates 242 are each connected to receive the exclusive-OR permission signal, PXOR. When PXOR is at logic high (1=true), the 5 LSB's of left-side prescaled signal 210o pass through AND gates 242 to corresponding inputs of a set of five OR gates 243. When PXOR is at logic low (0=false), AND gates 242 output zero signals to the five OR gates 243.

Five exclusive OR gates (XOR) are further provided as indicated at 240 with respective first inputs coupled to the outputs of five OR gates 243. Respective second inputs of the five XOR gates 240 are coupled to the respective five output lines of divider 233 (signal 220*o*). XOR gates 240 can be used to perform an exclusive OR between the 5 LSB's of signal 210*o* and the 5 bits of signal 220*o* when PXOR=1 and UV0=0.

A UV0 signal supplied from multiplexer 213 forces the outputs of all five OR gates 243 to logic high ("1") when UV0 goes high. In this case, XOR gates 240 output the 1's complement (the binary inversion) of the 5-bit wide, right-side signal 220*o* to a 5-bit wide pipeline register 252.

The UV0 signal, which is also referred to as the "negate" signal can be optionally used to form a 7-bit wide, 2's complement of the 5-bit value output by right-side divider 233. In addition to forcing the outputs of OR gates 243 high, the UV0 (negate) signal connects by way of a 1-bit wide pipeline register 254 to the carry-in input of adding unit 260. When UV0 is high, XOR gates 240 invert the 5 bits of the right-side prescaled signal 220*o* and the high carry-in signal increments the result.

Two sign-extension bits which are either 00 or 11 are appended to the more significant end of the 5-bit wide signal output from XOR gates 240 and the resulting 7-bit wide signal is applied to input port B of adding unit 260. UV1 serves as a sign-extend enabling signal which is applied to a first noninverting input of AND gate 245. The most significant bit (MSB) output by XOR gates 240 connects to a second noninverting input of AND gate 245. The output of AND gate 245 drives one input of OR gate 246. The output of OR gate 246 connects to a 1-bit wide pipeline register 253. The one-bit output of register 253 simultaneously drives the two MSB input lines of port-B of adder 260 to thereby define the two most significant bits of a 7-bit wide input (B) of adding unit 260.

When UV1 (XTEND enable) is high and the MSB output of XOR gates 240 is high, the two most significant bits of adder input-B are also driven high. If the MSB output of XOR gates 240 is low, the two most significant bits of adder input-B are also driven low. Adder 260 is thereby supplied with a 7-bit wide signed value at its input port-B even though pipeline register 252 and preceding units 240, 233, 212 and their interconnect busses are only 5-bits wide.

UV1 connects to an inverting input of another AND gate 244 while UV0 connects to a noninverting input of the same AND gate 244. AND gate 244 drives an input of OR gate 246. If UV1 (XTEND enable) is low but UV0 (NEG) high, the two most significant bits of adder input-B are driven high. (The adder carry-in is also set high.) In D-mode, the output of XOR gates 240 can be switched on a source pixel-by-source pixel basis between two of four possible combinations by setting different values for UV0 and UV1 in CRA 131 and CRB 132.

Consider the following two examples. In each case, the left-side signal 210*o* starts as the 7-bit value, 0100000 and the right-side signal 220*o* starts as the 5-bit value, 11111, but the outcome is different because UV1 is switched from logic zero ("0") to logic one ("1").

EXAMPLE 1

UV0 (Negate) is true (equal to logic one)
UV1 (Xtend) is false (equal to logic zero)

Register 251 contents= 0100000
Register 252 contents=   00000
Register 253 bits= 11
Register 254 bit=        1

Adder output 265= 0000001

In above Example 1, the contents of register 251 represents a decimal value of +32. The combined contents of registers 252–254 represent a decimal value of −31. Adder 260 therefore produces a 7-bit wide output signal 265 representing a decimal value of +1.

EXAMPLE 2

UV0 (Negate) is true (equal to logic one)
UV1 (Xtend) is true (equal to logic one)

Register 251 contents= 0100000
Register 252 contents=   00000
Register 253 bits= 00
Register 254 bit=        1

Adder output 265= 0100001

In above Example 2, the contents of register 251 represents a decimal value of +32. The combined contents of registers 252–254 now represent a decimal value of +1. Adder 260 therefore produces a 7-bit wide output signal 265 representing a decimal value of +33.

Besides the already mentioned pipeline registers 251–254, two further pipeline registers, 250 and 255, are provided for respectively receiving a post-addition scaling signal Dv2 from CMUx 133 and a clip-disable signal UV2 from selector 213. Pipeline registers 250–255 capture their respectively received signals just before a first system clock cycle comes to an end and output the captured signals at the beginning of a subsequent second system clock cycle in synchronism with clock signal CLK. The positioning of the pipeline registers 250–255 is dependent on the speed of the preceding logic circuits, as should be well known in the art. If faster logic is used, it may be possible to move the clock resynchronization point further down FIG. 2B, to a position below adding unit 260 for example.

Adder 260 generates an 8-bit wide output signal 265 representing the sum of the two 7-bit wide signals presented respectively at its A and B input ports.

If adding unit 260 is performing straightforward addition (PXOR=0, UV0=0, UV1=0) and the resultant sum is greater than decimal 127 (more than 7-bits wide), the most significant bit (MSB) of adder output signal 265 sets high. The MSB of adder output signal 265 connects to a noninverting first input of AND gate 285 (also referred to as clip-logic unit 285) to indicate to that logic unit 285 that the output of adder 260 has exceeded the 7-bit boundary. An inverting second input of AND gate 285 connects to the output of register 253. In the case where the output of register 253 is logic zero ("0") and the MSB of adder output signal 265 is logic one ("1"), AND gate 285 outputs a true CLIP+/−signal.

If the output of register 253 is logic one ("1"), AND gate 285 outputs a false ("0") CLIP+/−signal.

The 8-bit wide adder output signal 265 is supplied to a post-addition scaling unit (right shifter) 270. Shifter 270 performs either no shift or a 1-bit position right shift in accordance with a Dv2' signal supplied to it from CMUX 133 by way of pipeline register 250. Adder output signal 265 is thereby divided either by a one or a two.

The 8-bit output 275 of divider 270 is next supplied to an intensity wrap-around limiting unit 280. Wrap-limiting unit 280 has a 5-bit wide output port 287. If Clip-disable (UV2) is true, the wrap-limiting unit 280 simply passes the five least-significant (5 LSB's) of 8-bit signal 275 to its output port 287.

If Clip-disable (UV2) is logic zero ("0") and a true CLIP+/−signal is received from clip-logic unit 285, the wrap-limiting unit 280 tests the divider output signal 275 for a greater than +31 condition. If the 8-bit wide divider output signal 275 represents a value greater than 31, the 5-bit wide binary output 287 of wrap-limiting unit 280 is set to represent +31, otherwise the five least-significant (5 LSB's) of 8-bit signal 275 are passed through to its output port 287.

If Clip-disable (UV2) is logic zero ("0") and a false ("0") CLIP+/−signal is received from clip-logic unit 285, the wrap-limiting unit 280 tests the MSB of adder output signal 265. If it is logic one ("1") that means the result produced by adding unit 260 went below zero (went negative). In such a case, the 5-bit wide binary output 287 of wrap-limiting unit 280 is reset to represent decimal zero, otherwise the five least-significant (5 LSB's) of 8-bit signal 275 are passed through to its output port 287. A simple combinatorial circuit is used to implement the stated functions of unit 280.

Resynchronization register 290 captures the output of wrap limiter 280 and synchronizes it with the 25 MHz system clock.

The 5-bit wide output signal, (oPEN$_R$) of register 290 next enters a black-converter unit 295. (This happens only in the R-pipe unit 201, not in the G-pipe unit 202 or B-pipe unit 203.) When the black-converter unit 295 is selectively enabled and a black-detector circuit (NOR gate) 296 detects the condition, R=00000, G=00000, B=00000, the black-converter unit 295 inverts the least-significant bit of the oPENR signal, thereby modifying the output the PPMP unit 200 into an R=00001, G=00000, B=00000. The reason this is done is because the downstream CLUT/INT unit 140 includes a special background substituting circuit which replaces an input code of R=00000, G=00000, B=00000, with a user-defined background color (which could also be, but is not necessarily all zeroes). For cases where an artist wants the displayed output to appear black regardless of the setting of the background color, the modified value R=00001, G=00000, B=00000 is used instead. It was found that the human eye perceives this modified value as being closest to true black.

The 5-bit wide oPENR' output of black-converter unit 295 serves as the R color field of the 16-bit wide oPEN signal. In the G-pipe unit 202 the respective 5-bit color field oPENG is output from the G-pipe register (not shown) corresponding to register 290.

In the B-pipe unit 203, the least significant bit of the oPEN$_B$ field is truncated off if the 2-SP bits mode is active. The B-pipe unit 203 is selected as the place where B value precision is sacrificed because it was found that the human eye is least sensitive to variances in the blue part of the spectrum as compared to variances in the green and red parts of the spectrum.

Now that the structure of the PPMP pipes 201, 202 and 203 have been defined and the input sources for the PPMP 200 have been reviewed, an exemplary but non-exhaustive list of useful actions for the PPMP 200 is provided below in shorthand notation.

Suggested Useful PPMP Actions

1. Basic Mode

The 15 R$_I$G$_I$B$_I$-bits of the IPN code signal pass through the PPMP unmodified in the Basic mode.

To achieve this, the PPMP control bits of both PPMPC half-word are set to:
   S1=A(=IPN), MS=C(=SCoB), MxF=×8,
   Dv1=÷8, S2=D(=0), Dv2=÷1.

All PIN source data types (BBP=1 through 16) are valid. This is the basic 'non-extended' mode for the source data. It is the mode preferably used by many of the D-mode functions. In D-mode, however, at least one field of the PPMPCa half-word is different from the corresponding PPMCb half-word.

2. Intense 8-bit PIN mode

The 3 MSB's of an 8-bit PIN code are transferred out of the IPS as a single MUL multiplier (grey openacity) to be applied against the 15-bit R$_I$G$_I$B$_I$ field of the IPN code output from the PIP (SRC-A). The remaining 5 LSB's of the 8-bit PIN source serve as address inputs to the PIP.

An 8-bit wide PIN code therefore translates into 8 intensity levels of 32 independent colors.

To achieve this mode, the PPMP control bits are set to:
   S1=A(=IPN), MS=B(=MUL), MxF=xx(don't care),
   Dv1=÷8, S2=D(=0), Dv2=÷1.

Only the normal 8-bit PIN source data type is valid for this mode.

3. Intense 6-bit PIN mode

The D-bit sourced from a 6-bit wide PIN signal selects one of two common multipliers to be applied across the 15-bit R$_I$G$_I$B$_I$ field of an IPN signal (SRC-A). The remaining 5 LSBs of the 6-bit PIN signal serve as address inputs to the PIP.

A 6-bit wide PIN signal therefore translates into two intensity levels of 32 independent colors.

To achieve this mode, the PPMPCa control bits are set to:
   S1=A(=IPN), MS=C(=SCoB), MxF=×8,
   Dv1=÷8, S2=D(=0), Dv2=÷1.

The PPMPCb control bits are set to:
   S1=A(=IPN), MS=C(=SCoB), MxF=×4,
   Dv1=÷8, S2=D(=0), Dv2=÷1.

Only the normal 6-bit PIN source data type is valid for this mode.

4. Double 6-bit PIN mode

The D-bit sourced from a 6-bit wide PIN signal modulates the S2 value between the A and D inputs of selector 212, thereby selecting the second adder input to be either zero or the IPN signal. The remaining 5 LSBs of the 6-bit PIN source serve as address inputs to the PIP.

This doubles the range of 32 independent but appropriately selected colors.

To achieve this mode, the PPMPCa bits are set to:
   S1=A(=IPN), MS=C(=SCoB), MxF=×8,
   Dv1=÷8, S2=D(=0), Dv2=÷1.

The PPMPCb bits (0 are set to:
   S1=A(=IPN), MS=C(=SCoB), MxF=×8,
   Dv1=÷8, S2=A=(IPN), Dv2=÷1.

Only the normal 6-bit PIN source data type is valid in this mode.

For Doloresking effects, the following suggestions are made:

5. Multicolor reflective glass-color filter mode

Outside light filters through a stained glass window or through an analogous light-modifying medium with a per pixel scaled amount of interior background color added to mimic reflections. Phrased otherwise, this is Per pixel color openacity with Per-pixel Colored addition.

A 9-bit wide field (B13:5) of a 16-bit type PIN is used to form three sets of 3-bit wide individual multipliers ($MUL_R$, $MUL_G$, $MUL_B$) which are respectively applied to the three $R_O G_O B_O$ field components of a 15-bit wide tPEN signal sourced from the cFBD. The 5 LSBs (B4:0) of the 16-bit PIN source serve as address inputs to the PIP. The IPN outputs from the PIP are added to the result of the multiply. Both the openacity and the color add value are selectable on a per-pixel basis. Bit B14 of the PIN is unused. Bit B15 of the PIN is the D-bit.

To achieve this mode, the PPMPCa control bits (the first PPMPC half-word) are set as required for the doloresizing effect.

The PPMPCb control bits (the second PPMPC half-word) are set to:
S=B(=cFSD), MS=B(=MUL), MxF=xx,
Dv1=÷8, S2=A(=IPN), Dv2=÷1.

6. Multicolor reflective glass-grey filter mode

Outside fight filters through a stained glass window or through an analogous fight-modifying medium with a per pixel scaled amount of interior background grey style high-lighting added to mimic reflections. Phrased otherwise, this is Per-pixel grey openacity with Per-pixel Colored addition.

The 3 MSBs of an 8-bit wide PIN code are used as the common multiplier to the 15-bit tPEN from the cFBD. The remaining 5 LSBs of the 8-bit PIN source serve as the address inputs to the PIP. The IPN outputs from the PIP are added to the result of the multiply. Both the filter ratio and the color add value are selectable on a pixel-by-pixel basis.

To achieve this mode, the PPMPCa control bits are set as required for the Doloresking effect.

The PPMPCb control bits are set to:
S1=B(=cFBD), MS=B(=MUL), MxF=xx,
Dv1=÷8, S2=A(=IPN), Dv2=÷1.

Only the normal 8-bit PIN source data type is valid for this mode.

7. Multicolor reflective glass of uniform transparency with colored scaled amount of background light added: Grey openacity with Per-pixel Colored background addition:

The 3-bit wide MxF field from the SCoB is used as the common multiplier to the 15-bit $R_O G_O B_O$ field in the tPEN signal from the cFBD. The 15-bit IPN is added to the result of the multiply. This allows any size source data for the per-pixel colored add value.

To achieve this mode, the PPMPCa control bits are set as required for the Doloresizing effect.

The PPMPCb control bits are set to:
S1=B(=cFBD), MS=C(=SCoB), MxF=×8,
Dv1=÷8, S2=A(=IPN), Dv2=÷1.

All non-extended PIN source data types are valid.

8. Normal Shadow mode

Grey openacity, transparent mode:

The 3 MxF bits from the SCoB are used as the common multiplier to the 15-bit tPEN signal (from cFBD). The IPN is not used. The D-bit is set to be the inversion of the transparent bit (T-bit). This allows a shadow to be created from an existing SPRYTE without the need to create a separate mask SPRYTE in VRAM 120. Memory space is then conserved.

To achieve this mode, the PPMPCa control bits(0) are set to (who cares, it is transparent).

The PPMPCb control bits are set to:
S1=B(=cFBD), MS=C(=SCoB), MxF=×8,
Dv1=÷8, S2=D(=0), Dv2=÷1.

All non-extended source data types are valid.

9. D-Mode Shadow:

Grey openacity, PIP D-mode:

The 3 MxF bits from the SCoB are used as the common multiplier to the 15-bit :PEN signal (cFBD). The D-mode bit is taken from the IPN, the rest of the IPN is not used on the shadow. This allows a shadow to be created from a 1-bit per pixel source (mask). This allows for an attached shadow.

To achieve this mode, the PPMPCa control bits(0) are set as required.

The PPMPCb control bits are set to:
S1=B(=cFBD), MS=C(=SCoB), MxF=×8,
Dv1=÷8, S2=D(=0), Dr2=÷1.

All non-extended source data types are valid.

10. Simple Tint:

Per-pixel Colored add:

The 15-bit RGB portion of the IPN signal is added to the 15-bit RGB portion of the tPEN signal (cFBD). This allows any size of source data for the per-pixel colored add value. Requires the use of several PIP entries.

To achieve this mode, the PPMPCa control bits(0) are set as required.

The PPMPCb control bits are set to:
S1=A(=IPN), MS=C(=SCoS), MxF=×8,
Dv1=÷8, S2=B(=cFBD), Dv2=÷1.

All source data types are valid except double 6.

11. Intense 8 Tint:

Per-pixel Colored add, INTENSE 8:

The 15-bit IPN is multiplied by the 3 MSBs of an 8-bit PIN source and then added to the 15-bit cFBD. This allows the use of a single PIP entry.

To achieve this mode, the PPMPCa control bits(0) are set as required.

The PPMPCb control bits are set to:
S1=A(=IPN), MS=B(=MUL), MxF=xx,
Dv1=÷8, S2=B(=cFBD), Dv2=÷1.

Only the normal 8-bit PIN source data type is valid.

12. Average

The background and the source are added together and the result is divided by 2. This allows for interframe averaging. Any size source data can be used.

To achieve this mode, the PPMPCa control bits(0) are set as required.

The PPMPCb control bits are set to:
S1=B(=cFBD), MS=C(=SCoB), MxF=×8,
Dv1=÷8, S2=A(=IPN), Dv2=÷2.

All source data types are valid except double 6.

13. Color Filter/Enhancer

Per-pixel Color filter:

The 3 MSBs of each component (R, G, B) of the 15-bit IPN are used as the multiplier for each corresponding component (R, G, B) of the tPEN signal (cFBD). This results in a 0.125 through 1 range of multiplication values with 8 variation steps.

To achieve this mode, the PPMPCa control bits(O) are set as required.

The PPMPCb control bits are set to:
S1=S(=cFSD), MS=A(=IPNM), MxF=xx, Dv1=÷8, S2=D(=0), Dr2=÷1.

14. Multicolor Spotlight:

Per-pixel Color filter with cFBD adder:

The 3 MSBs of each component of the 15-bit IPN are used as the multiplier for each component of the tPEN signal (cFBD). The original cFBD value is then added to the result of the multiply. This results in a 1.125 through 2 range of multiplication values with 8 steps.

To achieve this mode, the PPMPCa control bits(0) are set as required.

The PPMPCb control bits are set to:
S1=B(=cFBD), MS=B(=IPN), MxF=xx, Dv1=÷8, S2=B(=cFBD), Dv2=÷1.

15. Dim Multicolor Spotlight with a Base Grey Level (Dim Sum):

Per-pixel Color filter with SCoB adder:

The 3 MSBs of each component of the 15-bit IPN are used as the multiplier for each component of the tPEN (cFBD). A 5-bit SCoB value (AV) is then added equally to each component at the result of the multiply. This results in a 0.125 through 1 range of multiplication values with 8 steps and a fixed offset.

To achieve this mode, the PPMPCa control bits(O) are set as required.

The PPMPCb control bits are set to:
S1=B(=cFBD), MS=A(=IPNM), MxF=xx, Dv1=÷8, S2=B(=cFBD), Dv2=÷1.

16. Quite Dim Multicolor Spotlight with a Base Grey Level:

Per-pixel Color filter with SCoB adder and final divide:

The 3 MSBs of each component of the 15-bit IPN are used as the multiplier for each R, G, B-component of the tPEN signal (cFBD). A 5-bit SCoB value (AV) is then added equally to each component at the result of the multiply. The final results is divided by 2. This results in a 0.065–<0.5 range of multiplication with 8 steps and a fixed offset.

To achieve this mode, the PPMPCa control bits are set to (as required).

The PPMPCb control bits are set to:
S1=B(=cFBD), MS=A(=IPNM), MxF=xx, Dv1=÷8, S2=B(=cFBD), Dv2=÷2.

The disclosed hardware can be judiciously used by a programmer/artist to create a sense of realism and true-time animation in machine-generated, bit-mapped images. The following is a nonexhaustive list of artistic "effects" which may be created within such images.

Shadow

To create this effect the programmer/artist uses the source data of a first spryte to create a destination rendering that looks like the shadow of the source spryte. The shadow appears to be projected on top of the surface of a background image (i.e. a darkening of the background in the shape of the spryte's image.)

This is accomplished by setting the primary source of the PPMP to be the current frame buffer data (which stores the background image), setting the primary scale factor to divide by 2 (or divide by less than 2 for a lighter shadow, divide by more than 2 for a darker shadow), and setting the secondary source of the PPMP to be the 0 (to specify that no second source is desired). Wherever the source spryte's image data is transparent there will be no effect on the frame buffer, because the entire rendering of a pixel is terminated if it is transparent. But wherever the image data is not transparent the frame buffer data values will be divided by 2 (or whatever chosen value) before being written back to the frame buffer. Thus the background image is darkened by the shape of the source spryte. Another copy of the source spryte can be rendered in an area above the shadow to create the impression that it is casting the shadow onto the background surface.

If the PPMP control flags are set to designate that the multiply part of the primary source scalar should come from the IPN, then the shadow can be made to be fainter or deeper from one pixel to the next. This is used to create a penumbra effect, where the shadow is faint around the edge and deepens toward the center.

If this effect is combined with the spryte engine's ability to rectilinearly distort the spryte image when rendering (the geometry control engines do this), and if the spryte is rendered in normal mode after its shadow has been rendered, the result looks exactly like a shadow being cast by a solid object.

Spotlight

In this effect the source image of the spryte acts as a spotlight that brightens (increases the value of) the colors of the frame buffer. This effect is achieved in the same way that the Shadow effect is created, except that the primary source scalar is set to augment the current frame buffer data, rather than diminish it.

Fire

By combining the spotlight effect and spryte animation, the programmer/artist can create an effect which looks like flames are illuminating a background scene.

The programmer/artist creates a spryte animation that looks like fire. Also, the programmer creates an orange Spotlight spryte, perhaps one with a penumbra. With judicious placement of the orange fire Spotlight, especially if multiple rendering of the orange Spotlight are employed and distributed about the background surface, the effect is of a fire that casts an orange glow on the surrounding objects.

Stained Glass or Windshield

With stained glass, a multi-colored surface lays over an image. Each piece of glass colors the backdrop image differently. Holding the glass together is a vein of lead, which is grey and opaque. With a windshield, the glass is greenish near the top and fades closer to transparent after a few inches. The glass is held in place by an opaque frame. Perhaps fuzzy dice depend opaquely from a rear-view mirror. Each of these examples of a semi-transparent object can be created using the same technique.

To create these effects the programmer/artist uses the per-pixel D-Mode selection that comes out of the IPS. The PPMP is set to select the current frame buffer data as the primary source and the spryte image data as the secondary source. The current frame buffer data values are diminished by a fixed amount (diminish it by half for stained glass, diminish it by one eighth for a windshield) and then add the per-pixel color value coming from the IPS (various colors and saturations for stained glass, dark green fading to black for the windshield).

Clouds

To create clouds, the Doloresizing mode is applied repeatedly when rendering partial cloud images, resulting in clouds that are soft-edged and have a gray density and translucency that is variable—in a word, realistic.

This is accomplished by creating a series of unique images that look like cloud-like amorphous blobs with feathered edges. Several (3 or more) of these images are selected to be the parts of the cloud. Each is rendered translucently, with Doloresizing enabled. The feathering allows the clouds that border the sky to blend into the color of the sky, without an artificial sharp edge to delineating cloud from sky. Where the clouds overlap the merging and blending of the images will create a variegated cloud image. Further, when the cloud animates, each individual part can be animated slightly differently from the others (e.g. a slightly slower velocity, or a horizontal scale that elongates), creating a cloud shape that constantly evolves in a realistic manner.

An added advantage of this type of spryte is that it can be stored in a memory area requiring a low number of bits per pixel. Rather than have a small number of very detailed clouds it's preferable to have a larger number of moderately detailed clouds. The result is less storage required and better looking clouds.

Although the description of this technique refers to clouds, the effect can be used for any imagery where partial; and shifting, if appropriate, opacity is desired.

Ripples

This effect modifies an image in a way that makes it look as if the image is on a surface that is rippling, or is beneath a rippling clear material (e.g. water) that causes refraction of the image.

To create this effect, the spryte engine's ability to render from any buffer to another is employed. Several renderings are done to the offscreen alternate frame buffer, of stages of the rise, crest and fall of the ripple, each stage with an appropriate distortion and pixel offset. The result of each offscreen rendering is then transferred to the current frame buffer, using the spryte engine a second time. With careful modeling of physics and a fine enough ripple resolution, the effect is compelling.

The placement of other objects in the scene, especially if they cast shadows, can help to establish whether the image is a rippling surface or an image beneath a clear rippling surface.

Another use of this technique is to create a magnifying glass effect. A magnified image is rendered offscreen and brought back into the current frame buffer with different projector magnifications to create zoom and unzoom effects.

Color Spaces (working with linear data and playing with multipliers)

With linear 8-bit data, or with coded 8-bit data where 5 bits select the PIP and 3 bits define a multiplier, the programmer/artist can use a relatively small amount of data to create a large color space.

Anti-aliasing

The artist can arrange pixels that form a Doloresizing border around the outside of a spryte image. This makes for softer spryte imagery that blends softly into the frame buffer.

Modifying Color and Illumination Levels

By employing simple PIP manipulations the programmer/artist gets a wide range of control over the color and brightness of the image's pixels. Here, the programmer keeps a copy of the spryte's original PIP. When the color or brightness is to be modified, a new PIP is created starting from the original. The spryte is set to use the modified PIP, not the original. This technique allows a scalar to be applied to each RGB component separately. However, if the scalar is the same across all three RGB components the effect is of a modification of illumination rather than color.

3D Effects

By using the rectilinear image distortion capabilities of the spryte system's geometry engines in a uniform way, a way that's tied to a database that defines a 3-dimensional universe, it's very easy to create 3-dimensional bitmapped renderings of scenes. The four corners of the spryte image map to the x and y coordinates of four points in the 3-dimensional universe. This allows a programmer to create the illusion of bitmap images being projected onto 3-dimensional surfaces.

Animation Distortions

By using the rectilinear image distortion capabilities of the spryte rendering system in a non-uniform way, conventional animation effects can be given much more character with no extra storage cost.

Conventional animation is accomplished by creating a series of animation images and the presenting one after another in rapid order, giving the illusion of movement. The programmer/artist can enhance normal animation by elongating and otherwise distorting the animation images, adding a new dynamic range of effects to animation characters.

Image Projector

With multiple renderings into offscreen buffers, followed by clipping of the imagery to fit the forms, an image can be made to project onto the walls, floors, and objects of a scene.

High-resolution Fonts in a Low-resolution Pixel Coordinate Space

One usage of the independent setting of subposition bits is to create a font that's balanced at a subpixel level. This can be used to create smooth imagery even though the initial imagery is more jagged.

The above disclosure is to be taken as illustrative of the invention, not as limiting its scope or spirit. Numerous modifications and variations will become apparent to those skilled in the art after studying the above disclosure.

By way of example, the PPMP design can be modified as mentioned earlier so that selector 213 supplies a signal derived from part of the IPN signal 207 or tPEN signal 208 to define the Dv3 divide factor used by divider 233. Right-side pre-scaling unit 233 can be expanded to provide, in addition to the three scaling factors, $\frac{1}{1}$, $\frac{1}{2}$ and $\frac{1}{4}$, a fourth scaling factor (e.g. $\frac{1}{3}$) in response to a fourth, unused setting of control bits UV3 and UV4. If the fourth scaling factor of unit 233 is a multiply by zero, input port D of selector 212 can be coupled to receive, instead of zero, a different control signal.

Additionally, it is to be understood that source-image data can reside in addressable parts of system memory other than VRAM 120. System memory can include a slower SRAM section, DRAM, RAMBUS™ and so forth.

Given the above disclosure of general concepts and specific embodiments, the scope of protection sought is to be defined by the claims appended hereto.

What is claimed is:

1. An image signal processing apparatus comprising one or a plurality of pixel-component processing units where each pixel-component processing unit includes:

(a) first input selector means for receiving and selecting one of a first set of plural image-defining signals, each of the first set of plural image-defining signals representing a stream of pixel-component values that provide initial, but-modifiable definitions for a stream of pixels in a corresponding image;

(b) second input selector means for receiving and selecting one of a second set of plural image-defining signals, each of the second set of plural image-defining signals representing a stream of pixel-component values that provide initial, but-modifiable definitions for a stream of pixels in a corresponding image, where the second set of plural image-defining signals can include some or all of the signals in the first set;

(c) first pre-scale factor defining means for variably defining a first prescaling factor, where the first pre-scale factor defining means is responsive to a signal in one of said first and second sets of plural image-defining signals;

(d) first pre-scaling means, coupled to the first input selector means and the first pre-scale factor defining means, for scaling one or more of the pixel-component values of an image-defining signal selected by the first input selector means by the variably-defined first prescaling factor and for thereby producing a corresponding first pre-scaled signal having one or more once-scaled pixel-component values representing the one or more pixel-component values of the image-defining signal selected by the first input selector means, multiplied by the variably-defined first prescaling factor; and (e) combiner means for producing a combined image signal representing a function of the combination of the pixel-component values of the first pre-scaled signal and of the signal selected by the second input selector means or a scaled version thereof.

2. The apparatus of claim 1 wherein the first pre-scaling means includes a multiplier and a divider, coupled one to the next, one of said multiplier and divider receiving the output of the first input selector means;

wherein the first pre-scale factor defining means includes a multiply-value selector, coupled to the multiplier, for selecting one of a plurality of multiplier signals to represent a multiply value and for presenting the selected multiply value to the multiplier; and wherein said plurality of multiplier signals includes at least one signal derived from one of the first set of plural image-defining signals.

3. The apparatus of claim 2 wherein each signal in said first and second sets of plural image-defining signals is N-bits wide, N being an integer greater than one, and each signal in said plurality of multiplier signals is M-bits wide, M being an integer greater than one but less than or equal to N.

4. The apparatus of claim 3 wherein N is 5 and M is 3.

5. The apparatus of claim 3 wherein said plurality of multiplier signals includes: a first multiplier signal derived from one part of said first set of plural image-defining signals, a second multiplier signal derived from a second part of said first set of plural image-defining signals, and a third multiplier signal derived from a third part of said first set of plural image-defining signals.

6. The apparatus of claim 5 wherein one of the signals in said first set of plural image-defining signals includes a first N-bit wide part, a second M-bit wide part and a third K-bit wide part where N, M and K are integers satisfying the relationship K<M<N, and at least one of the second M-bit wide part and third K-bit wide part is supplied to the first pre-scale factor defining means for defining the first prescaling factor.

7. The apparatus of claim 6 wherein K=1, M=3 and N=5.

8. The apparatus of claim 3 wherein M is less than N.

9. The apparatus of claim 1 wherein said combiner means includes adding means for producing a combined image signal representing the sum of the pixel-component values of the first pre-scaled signal and of the signal selected by the second input selector means or a scaled version thereof.

10. An image processing apparatus according to claim 9 further comprising:

(f) wrap-limiting means, responsive to a supplied option-control signal, for optionally limiting the values of signals produced by said adding means to a range having predefined minimum and maximum values.

11. The apparatus of claim 1 wherein said first and second sets of image-defining signals are digital signals each having binary-coded fields representing their respective pixel-component values, and wherein said combiner means includes logic-function means for producing a combined image signal representing a logical-combination of the binary-coded pixel-component values of the first pre-scaled signal and of the signal selected by the second input selector means or a scaled version thereof.

12. The apparatus of claim 11 wherein each of said binary-coded fields of the first and second sets of image-defining signals is at least two bits wide, and wherein said logic-function means includes a plurality of exclusive OR gates for producing a combined image signal representing an exclusive-OR combination of the binary-coded pixel-component values of the first pre-scaled signal and of the corresponding binary-coded pixel-component values of the signal selected by the second input selector means or a scaled version thereof.

13. The apparatus of claim 11 wherein said first pre-scaled signal is J-bits wide and the signal selected by the second input selector means or the scaled version thereof is N-bits wide, J being an integer greater than N, and N being an integer greater than one, and wherein the logic-function means includes bit-extension means for extending the width of the signal selected by the second input selector means or the scaled version thereof to produce a corresponding signal having a bit-width matching that of the first pre-scaled signal.

14. The apparatus of claim 1 further comprising:

second pre-scale factor defining means for defining a second prescaling factor; and second pre-scaling means, coupled to the second input selector means and the second pre-scale factor defining means, for scaling the value of an image-defining signal selected by the second input selector means by the second prescaling factor and for producing a corresponding second pre-scaled signal representing the value of the image-defining signal selected by the second input selector means, multiplied by said second prescaling factor.

15. The apparatus of claim 14 wherein said second prescaling factor is defined a component of said first set of plural image-defining signals.

16. The apparatus of claim 1 further comprising:

post-combination scale-factor defining means for defining a post-combination scaling factor; and post-combination scaling means, coupled to the combiner means and the post-combination scale-factor defining means, for scaling the value of the combined image signal by the post-combination scaling factor and for producing a corresponding post-scaled signal representing the value of the combined image signal multiplied by said post-combination scaling factor.

17. The apparatus of claim 16 wherein said post-combination scaling factor is defined a component of said first set of plural image-defining signals.

18. An image signal processing apparatus in accordance with claim 16 further comprising:

wrap limiter means for producing an optionally-limited signal representing the output of the post-combination scaling means, where the value of said optionally-limited signal is equal to the value of the signal produced by the combination of the combiner means and the post-combination scaling means, optionally limited to predefined minimum and maximum values.

19. An image signal processing apparatus in accordance with any one of above claims 1, 9, 11, 14, 16 and 18 further comprising:

image rendering means for rendering on a video display or the like, an image defined by the combined image signal or a derivative thereof.

20. The apparatus of claim 1 wherein the number of pixel-component processing units is two or more.

21. The apparatus of claim 20 wherein:

the number of pixel-component processing units is three or more;

each signal of the first and second sets of plural image-defining signals is divisible into at least three pixel-predefining components;

the at least three pixel-predefining components respectively represent an initial, but-modifiable mix of complementary color intensities for each corresponding pixel of the respective image-defining signal; and each of the three or more pixel-component processing units process a respective one of the at least three pixel-predefining components of the received first and second sets of plural image-defining signals.

22. The apparatus of claim 21 wherein the initial mix of complementary color intensities represent the (a) Red, Green and Blue or (b) Magenta, Cyan, and Yellow intensities of the corresponding pixel.

23. An image signal processing apparatus in accordance with any one of above claims 1, 9, 11, 14, 16 and 19 further comprising:

a first control word register for storing a first control word;

a second control word register for storing a second control word; and a control multiplexer having first and second inputs respectively coupled to said first and second control word registers, the control multiplexer further having an output coupled to: (a) said first input selector means, (b) said second input selector means, (c) said second pre-scale factor defining means, (d) said first pre-scale factor defining means, and (e) said post-combination scaling means.

24. The apparatus of claim 23 wherein the control multiplexer is responsive to portion of said first set of plural image-defining signals.

25. An image signal processing apparatus according to claim 1 wherein said first and second sets of image-defining signals are digital signals each having digital fields representing their respective pixel-component values, and wherein the first pre-scaling means includes one or both of:

(d.1) a digital multiplying means for, in essence, digitally multiplying the one or more pixel-component values of the image-defining signal selected by the first input selector means by a multiplying factor that defines part or all of said first prescaling factor; and (d.2) a digital dividing means for, in essence, digitally dividing the one or more pixel-component values of the image-defining signal selected by the first input selector means by a dividing factor that defines part or all of said first prescaling factor.

26. An image signal processing apparatus according to claim 1 wherein said first and second sets of image-defining signals are simultaneously presented to the respective first and second input selector means so as to define a temporal interrelation between the pixel-component values of the selected ones of the first and second sets of image-defining signals.

27. An image signal processing apparatus according to claim 1 wherein said first and second sets of image-defining signals share at least one common image-defining signal.

28. An image signal processing apparatus according to claim 27 wherein the second input selector means further receives for selection, at least one alternate signal not included in the set of signals received by the first input selector means.

29. An image processing apparatus according to claim 1 further comprising:

(f) wrap-limiting means, responsive to a supplied option-control signal, for optionally limiting the values of signals produced by said combining means to a range having predefined minimum and maximum values.

30. An image signal processing apparatus comprising one or a plurality of pixel-component processing units where each pixel-component processing unit includes:

(a) first input selector means for receiving and selecting one of a first set of plural image-defining signals;

(b) second input selector means for receiving and selecting one of a second set of plural image-defining signals, where the second set of plural image-defining signals can include some or all of the signals in the first set;

(c) multiply-factor selector means for receiving and selecting one of a set of plural multiply values in accordance with a supplied multiplier-select signal;

(d) multiplier means, coupled to the first input selector means and the multiply-factor selector means, for producing a multiplied signal representing the product of a value of an image-defining signal selected by the first input selector means and a multiply value selected by the multiply-factor selector means;

(e) first divider means, coupled to the output of the multiplier means, for producing a left-side pre-scaled signal representing the value of the multiplied signal produced by the multiplier means divided by the value of a supplied first divide factor defining signal;

(f) second divider means for producing a right-side pre-scaled signal representing the output of the second selector means divided by the value of a second supplied divide factor defining signal;

(g) adder means for producing a sum signal representing the sum of the values represented by the left and right-side pre-scaled signals;

(h) third divider means for producing a post-scaled signal representing the value of the sum signal produced by the adder means divided by the value represented by a supplied third divide factor defining signal; and (i) wrap limiter means for producing an optionally-limited signal representing the output of the third divider means where the value of said optionally-limited signal is equal to the value of the signal produced by the combination of the adder means and the second divider means, optionally limited to predefined minimum and maximum values.

31. The signal processing apparatus of claim 30 wherein said image-defining signals include R, G and B components each representing the intensity of one in a triage of opposed colors of a color wheel and wherein there are at least three pixel-component processing units respectively for processing the R, G and B components of the supplied image-defining signals.

32. An apparatus for processing image-defining signals where the image-defining signals are used to produce an image composed of a matrix of pixels, the apparatus comprising:

a first input port for receiving a first image-defining signal, where said first image-defining signal is divisible into two or more pixel-predefining components, where each pixel-predefining component of the first image-predefining signal predefines a non-final attribute of a corresponding pixel;

a second input port for receiving a second image-defining signal, where said second image-defining signal is divisible into two or more pixel-predefining components, where each pixel-predefining component of the second image-defining signal predefines a non-final attribute of a corresponding pixel;

a third input port for receiving image-processing control signals, and two or more image-processing units, operatively coupled to the first, second and third input ports, wherein each of the two or more image-processing units receives a corresponding one of the two or more pixel-predefining components from each of the first and second image-defining signals, wherein said image-processing control signals include a multiplier-selecting signal and a multiply-factor signal; and wherein each of the two or more image-processing units includes:

a first input selector having first and second selector inputs, a selector control input and a selector output, where the control input of the first selector is operatively coupled to receive the multiplier-selecting signal from said control port, where the first selector input is operatively coupled to receive a portion or all of the corresponding pixel-predefining component from the first image-defining signal, where the second selector input is operatively coupled to receive the multiply-factor signal from said control port, and where the output of the first selector outputs a selected one of the signals received by the inputs of the first selector in accordance with the multiplier-selecting signal supplied to the first selector's control port; and a multiplier having first and second multiplier inputs and a multiplier output, where the first multiplier input is operatively coupled to receive the corresponding pixel-predefining component from one of the first and second image-defining signals, where the second multiplier input is operatively coupled to the output of the first selector, and where the multiplier output produces a multiplier output signal representing the product of the signals received at the first and second multiplier inputs.

33. The apparatus of claim 32 wherein the number of image-processing units is three or more.

34. The apparatus of claim 33 wherein the first image-defining signal is divisible into at least three pixel-predefining components and the at least three components respectively represent an initial triage of complementary color intensities for a corresponding pixel.

35. The apparatus of claim 34 wherein the initial triage of complementary color intensities represent the (a) Red, Green and Blue or (b) Magenta, Cyan, and Yellow intensities of the corresponding pixel.

36. The apparatus of claim 32 wherein the second image-defining signal is also divisible into at least two pixel-predefining components and the at least two components respectively represent an initial duet or triage of different color intensity vectors for a corresponding pixel.

37. The apparatus of claim 32 further comprising:

a first divider, coupled to the multiplier output, for producing a first scaled signal representing the value of the multiplier output signal divided by a predetermined first divisor.

38. The apparatus of claim 37 wherein the first divisor is two raised to the power of a positive integer.

39. An image rendering method comprising the steps of:

(a) receiving first and second image defining signals, wherein each of the received image defining signals represents a stream of pixel-component values that provide initial, but-modifiable magnitude definitions for a stream of pixels in a corresponding image;

(b) scaling the pixel-component values of one of the first and second image defining signals in accordance with a scaling factor defined by contents of the same or another of the first and second image defining signals;

(c) combining the scaled image-defining signal with the same or another of the first and second image defining signals;

(d) in response to a supplied option-control signal, optionally limiting the values of signals produced by said combining step to a range having predefined minimum add maximum values; and (e) in response to a control signal that accompanies the first and second image defining signals on a pixel-bypixel basis, enabling and disabling said step of optionally limiting the values of the produced signals on a pixel-by-pixel basis.

40. An image signal processing apparatus comprising one or a plurality of pixel-component processing units where each pixel-component processing unit includes:

(a) an input selector for receiving a plurality of image-defining signals, and for outputting a selected one of the received image-defining signals, wherein each of the received image-defining signals represents a stream of pixel-component values that provide initial, but-modifiable magnitude definitions for a corresponding stream of pixels in a corresponding image;

(b) scale factor defining means for variably defining a scaling factor, where the scale factor defining means is responsive to one of the received image-defining signals; and (c) scaling means, coupled to the input selector and the scale factor defining means, for scaling one or more pixel-component values of the image-defining signal selected by the input selector by the variably-defined scaling factor and for thereby producing a correspondingly scaled signal having a plurality of scaled pixel-component values representing the one or more pixel-component values of the image-defining signal selected by the first input selector means, multiplied by the variably-defined scaling factor.

\* \* \* \* \*